(12) United States Patent
Kakinami et al.

(10) Patent No.: US 7,946,389 B2
(45) Date of Patent: May 24, 2011

(54) OIL SUPPLY SYSTEM FOR VEHICLE

(75) Inventors: Takuma Kakinami, Toyota (JP);
Atsushi Tabata, Okazaki (JP); Yuji Iwase, Mishima (JP); Tomoo Atarashi, Kariya (JP); Atsushi Teshima, Toyota (JP)

(73) Assignees: Toyota Jidosha Kabushiki Kaisha, Aichi-ken (JP); Aisin AW Co., Ltd., Aichi-ken (JP)

( * ) Notice: Subject to any disclaimer, the term of this patent is extended or adjusted under 35 U.S.C. 154(b) by 0 days.

(21) Appl. No.: 12/105,468

(22) Filed: Apr. 18, 2008

(65) Prior Publication Data
US 2008/0308355 A1 Dec. 18, 2008

(30) Foreign Application Priority Data
Apr. 20, 2007 (JP) .................. 2007-111623

(51) Int. Cl.
*F16N 13/00* (2006.01)
*F16N 7/14* (2006.01)
(52) U.S. Cl. ........ 184/27.2; 184/6.12; 184/6.3; 184/6.5; 184/27.1; 123/196 R
(58) Field of Classification Search ............ 184/27.2, 184/6.4, 6.5, 6.22, 37, 27.1, 104.1; 123/41.42, 123/196 R; 74/467, 718; 475/72, 83, 159; 477/3, 46; 474/18, 28
See application file for complete search history.

(56) References Cited

U.S. PATENT DOCUMENTS 5,769,182 A * 6/1998 Parenteau .................. 184/6.4
6,306,061 B1 * 10/2001 Inamura et al. ............ 477/45
2001/0024988 A1 * 9/2001 Kashiwase ................. 475/210
2006/0065217 A1 * 3/2006 Ikegawa ..................... 123/41.42
2006/0070600 A1 * 4/2006 Hara ........................... 123/196 R

FOREIGN PATENT DOCUMENTS

| JP | 11-287316 A | 10/1999 |
| JP | 2004-076817 A | 3/2004 |
| JP | 2004-278713 A | 10/2004 |
| JP | 2005030495 A * | 2/2005 |
| JP | 2005-098337 A | 4/2005 |
| JP | 2005-172112 A | 6/2005 |
| JP | 2005-273633 A | 10/2005 |
| JP | 2005-315271 A | 11/2005 |
| JP | 2006161850 A * | 6/2006 |
| WO | 2006016797 A1 | 2/2006 |

OTHER PUBLICATIONS

Chinese Office Action dated Feb. 24, 2010.

* cited by examiner

*Primary Examiner* — Robert A Siconolfi
*Assistant Examiner* — San Aung
(74) *Attorney, Agent, or Firm* — Sughrue Mion, PLLC

(57) ABSTRACT

An oil supply system for a vehicle includes: a mechanical oil pump driven by an engine; an electric oil pump driven by an electric motor; a hydraulic pressure control circuit supplied with oil from the mechanical oil pump and the electric oil pump through an oil discharge passage for the mechanical oil pump and an oil discharge passage for the electric oil pump, which are connected to each other; a lubrication/cooling oil passage that is supplied with the oil from the hydraulic pressure control circuit; and a communication passage that provides communication between the lubrication/cooling oil passage and the mechanical oil pump. With this oil supply system, it is possible to prevent the electric oil pump from causing air-sucking noise, for example, in the motor-power cruise mode, and to improve the rising characteristics of the hydraulic pressure produced by the mechanical oil pump during startup of the engine.

12 Claims, 13 Drawing Sheets

<PRIOR ART>

<PRIOR ART>

<PRIOR ART>

OIL SUPPLY SYSTEM FOR VEHICLE

INCORPORATION BY REFERENCE

The disclosure of Japanese Patent Application No. 2007-111623 filed on Apr. 20, 2007 including the specification, drawings and abstract is incorporated herein by reference in its entirety.

BACKGROUND OF THE INVENTION

1. Field of the Invention

The invention relates generally to an oil supply system for a vehicle, which includes a mechanical oil pump that is driven by an engine and an electric oil pump that is driven by an electric motor, and, more specifically to a technology for improving the rising characteristics of the hydraulic pressure produced by the mechanical oil pump during startup of an engine.

2. Description of the Related Art

Japanese Patent Application Publication No. JP-2005-315271 (JP-A-2005-315271) describes an oil supply system for a vehicle, which includes a mechanical oil pump that is driven by an engine and an electric oil pump that is driven by an electric motor. In the oil supply system, an oil discharge passage for the mechanical oil pump and an oil discharge passage for the electric oil pump are connected to each other, and the oil is supplied to a predetermined hydraulic pressure control circuit through these oil discharge passages. The oil supply system may be mounted in an eco-run vehicle in which an engine is stopped when the vehicle is stopped or a hybrid vehicle in which an engine and an electric motor are used in combination as drive power sources.

The mechanical oil pump may be at least partially above the oil level depending on the manner in which the mechanical oil pump is connected to the engine, the manner in which the mechanical oil pump is mounted in the vehicle, etc. Therefore, for example, while the engine is stopped or while the vehicle is left unused for a long time, the oil leaks from the mechanical oil pump and the air enters the mechanical oil pump through a gap formed in the mechanical oil pump (for example, a gap between a case and a cover), which deteriorates the rising characteristics of the hydraulic pressure produced by the mechanical oil pump during startup of the engine. An oil supply system 200 for a vehicle shown in FIG. 22 includes a mechanical oil pump 202 and an electric oil pump 204. In such oil supply system for a vehicle, when a power switch is turned on to allow the vehicle to run, only the electric oil pump 204 is actuated first to achieve a predetermined hydraulic pressure. However, the oil does not reach an inlet port of the mechanical oil pump 202 easily. Therefore, even when an engine 206 is started in response to, for example, depression of an accelerator pedal, the mechanical oil pump 202 runs idle due to presence of the air. As a result, the hydraulic pressure produced by the mechanical oil pump 202 does not exhibit appropriate rising characteristics. Therefore, a large-capacity pump needs to be used as the mechanical oil pump 204. In addition, the time at which the electric oil pump 204 is stopped in response to the actuation of the mechanical oil pump 202 is retarded. As a result, the fuel efficiency is reduced.

In an oil supply system 210 shown in FIG. 23, a check valve 212 and a check valve 214 are provided in the oil discharge passage for the mechanical oil pump 202 and the oil discharge passage for the electric oil pump 204, respectively, in order to increase the motor efficiency when each of the mechanical oil pump 202 and the electric oil pump 204 is operated by itself. In such oil supply system, if the oil leaks from the mechanical oil pump 202 and the air enters the mechanical oil pump 202 through a gap formed in the mechanical oil pump 202 when the engine 206 is stopped, for example, when the motor-power cruise mode is selected in the hybrid vehicle, the hydraulic pressure produced by the mechanical oil pump 202 does not exhibit appropriate rising characteristics due to presence of the air when the engine 206 is restarted to shift the cruise mode to the engine-power cruise mode. In addition, the air remains in the mechanical oil pump 202 because the check valve 212 is kept closed by the hydraulic pressure from the electric oil pump 204. Therefore, the mechanical oil pump 202 continues running idle, which further deteriorates the rising characteristics of the hydraulic pressure produced by the mechanical oil pump 202. Similar problems may occur in the case where only the electric oil pump 204 is actuated first when a driver turns the power switch on, and then the engine 206 is started in response to, for example, depression of the accelerator pedal.

When the hybrid vehicle is in the motor-power cruise mode, the engine 206 is stopped and a predetermined hydraulic pressure is achieved by the electric oil pump 204. As in the oil supply systems 200 and 210 in which an inlet port (strainer in FIGS. 22 and 23) 216 is shared by the mechanical oil pump 202 and the electric oil pump 204 in order to save space, the oil is sucked into the electric oil pump 204 also from the mechanical oil pump 202 side due to a vacuum pressure produced by the electric oil pump 204. Therefore, the air may enter the mechanical oil pump 202 through a gap formed in the mechanical oil pump 202. The air that has entered the mechanical oil pump 202 is eventually sucked into the electric oil pump 204 along with the oil due to a vacuum pressure produced by the electric oil pump 204, as shown in FIG. 24. At this time, air-sucking noise may be caused.

SUMMARY OF THE INVENTION

The invention is made in light of the above-described circumstances. The invention provides an oil supply system for a vehicle, which includes a mechanical oil pump and an electric oil pump, and which makes it possible to avoid the situation in which air enters the mechanical oil pump while an engine is stopped and the rising characteristics of the hydraulic pressure produced by the mechanical oil pump during startup of the engine deteriorate due to presence of the air in the mechanical pump, and the situation in which the electric oil pump sucks the air and causes air-sucking noise.

An aspect of the invention relates to an oil supply system for a vehicle, including: a mechanical oil pump that is driven by an engine; an electric oil pump that is driven by an electric motor; a hydraulic pressure control circuit that is supplied with oil from the mechanical oil pump and the electric oil pump through an oil discharge passage for the mechanical oil pump and an oil discharge passage for the electric oil pump, which are connected to each other; a lubrication/cooling oil passage that is supplied with the oil from the hydraulic pressure control circuit; and a communication passage that provides communication between the lubrication/cooling oil passage and the mechanical oil pump.

In the oil supply system according to the aspect of the invention described above, the communication passage that provides communication between the lubrication/cooling oil passage, to which the oil is supplied from the hydraulic pressure control circuit, and the mechanical oil pump is formed. Therefore, while the engine is stopped, the oil is supplied from the lubrication/cooling oil passage to the mechanical oil pump through the communication passage, or the air that has entered the mechanical oil pump is sucked into the lubrication/cooling oil passage through the communication passage. Thus, the air, which is accumulated in the mechanical oil pump while the vehicle is left unused for a long time, is promptly removed in accordance with the operation of the electric oil pump. In addition, it is possible to prevent the air from accumulating in the mechanical oil pump while the engine is stopped. When a check valve is provided in the oil discharge passage for the mechanical oil pump and the communication passage is connected to the oil discharge passage, the air in the mechanical oil pump is promptly discharged through the communication passage in response to startup of the engine. Thus, it is possible to avoid the situation in which the rising characteristics of the hydraulic pressure produced by the mechanical oil pump during startup of the engine deteriorate due to presence of the air in the mechanical oil pump, and the situation in which the electric oil pump sucks the air from the mechanical oil pump and causes air-sucking noise.

In addition, because the communication passage is formed between the lubrication/cooling oil passage and the mechanical oil pump, an influence is not exerted on the operation of hydraulically-driven devices such as a hydraulic cylinder that needs a high hydraulic pressure during, for example, a gear-change control over an automatic transmission. Accordingly, hydraulic pressure controls such as the gear-change control are executed at high accuracy.

BRIEF DESCRIPTION OF THE DRAWINGS

The foregoing and further features and advantages of the invention will be better understood by reading the following detailed description of example embodiments of the invention, when considered in connection with the accompanying drawings, in which.

DETAILED DESCRIPTION OF EMBODIMENTS

Figure 1:
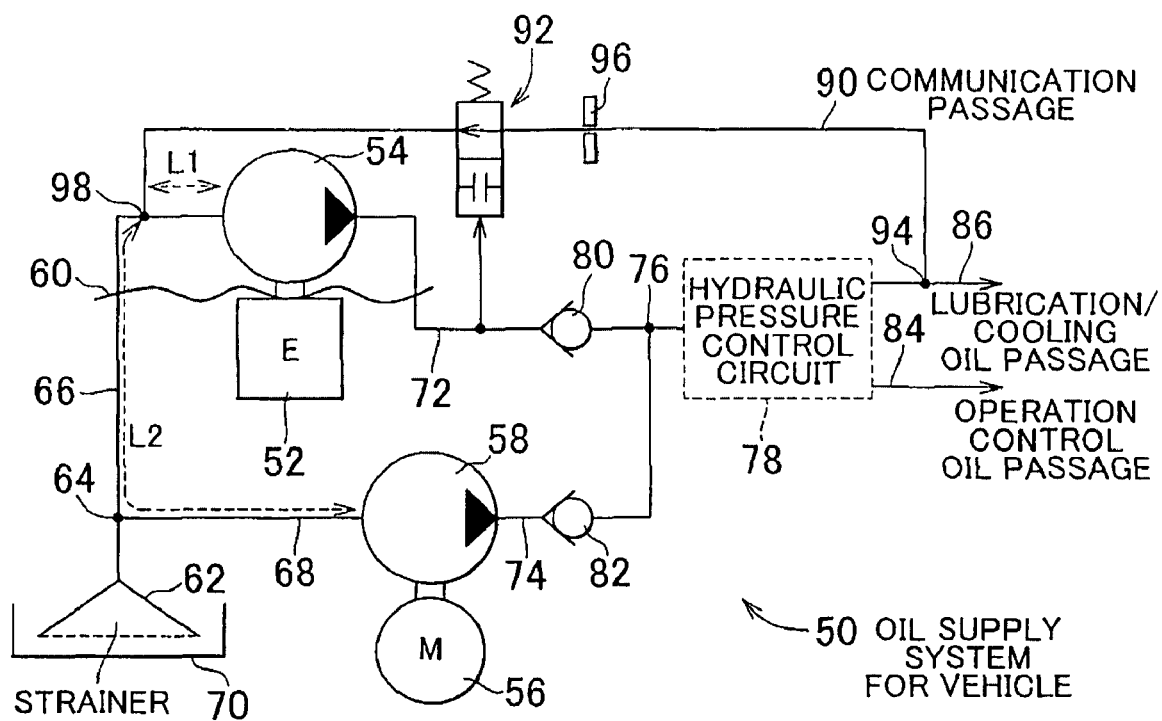
FIG. 1 is a circuit diagram showing an oil supply system for a vehicle according to a first embodiment of the invention.

In the following description and the accompanying drawings, the invention will be described in greater detail with reference to the example embodiments.

An oil supply system for a vehicle according to the invention is suitable for a hybrid vehicle that uses an engine and an electric motor as drive power sources, and that has multiple cruise modes such as an engine-power cruise mode, in which the vehicle travels using the engine as the drive power source, and a motor-power cruise mode, in which the engine is stopped and the vehicle travels using only the electric motor as the drive power source. The oil supply system for a vehicle may also be applied to an eco-run vehicle in which an engine is temporarily stopped when the vehicle is stopped.

Connected to a hydraulic pressure control circuit to which the oil is supplied by the oil supply system are: a lubrication/cooling oil passage that supplies oil which has a relatively low pressure and which is used to lubricate or cool various portions; and an operation control oil passage that supplies oil having a predetermined relatively high pressure to hydraulically-driven devices such as gear-change hydraulically-driven devices (clutches and brakes) of an automatic transmission. The hydraulic pressure control circuit includes, for example, a regulator valve that electrically or mechanically adjusts the hydraulic pressure to a predetermined hydraulic pressure, for example, a line pressure. In this specification, the term "lubrication/cooling oil passage" means an oil passage through which the oil, which does not exert an influence on the operation of hydraulically-driven devices such as a hydraulic cylinder that needs a high hydraulic pressure during the gear-change control over the automatic transmission, flows. In other words, the term "lubrication/cooling oil passage" does not always mean an oil passage through which the oil used to lubricate or cool various portions flows. Examples of the "lubrication/cooling oil passage" include a drain oil passage through which the oil is returned to an oil pan, and a return oil passage at a portion downstream of an oil cooler.

An oil intake passage for a mechanical oil pump and an oil intake passage for an electric oil pump are connected, at their middle portions, to each other. Therefore, the mechanical oil pump and the electric oil pump suck oil up through a shared inlet port. Alternatively, the oil intake passage of the mechanical oil pump and the oil intake passage of the electric oil pump may be formed so as to separately extend up to the shared inlet port. Preferably, blocking devices that prevent back flows are provided in an oil discharge passage for the mechanical oil pump and an oil discharge passage for the electric oil pump. However, the oil discharge passage for the mechanical oil pump and the oil discharge passage for the electric oil pump may be connected to each other without provision of such blocking devices. As the blocking device, a check valve that permits the oil to flow only in the supply direction is preferably used. Alternatively, a pilot hydraulic pressure opening/closing valve or a solenoid opening/closing valve may be employed as the blocking device. The pilot hydraulic pressure opening/closing valve mechanically changes the oil-flow state between the oil-flow permitted state and the oil-flow blocked state using a predetermined pilot hydraulic pressure. The solenoid opening/closing valve electrically changes the oil-flow state between the oil-flow permitted state and the oil-flow blocked state using a solenoid, when necessary. As the pilot hydraulic pressure, for example, a hydraulic pressure at a position between the mechanical oil pump or the electric oil pump, and the pilot hydraulic pressure opening/closing valve is preferably used.

The mechanical oil pump may be at least partially above the oil level of the oil in a case of a power transfer device, for example, a transmission case, depending on the manner in which the mechanical oil pump is connected to the engine, the manner in which the mechanical oil pump is mounted in the vehicle, etc. Therefore, for example, while the engine is stopped or while the vehicle is left unused for a long time, the oil may leak through a gap between the case and a cover and the air may enter the mechanical oil pump through the gap. The invention is appropriately applied in such a case. As the mechanical oil pump, for example, an internal gear pump, an external gear pump or a vane pump is preferably used. The mechanical oil pump is usually disposed in such a manner that the axis of the mechanical oil pump extends substantially horizontally, due to the positional relationship with the engine. For example, the mechanical oil pump is arranged coaxially with the engine, and is rotated by a crankshaft of the engine. Alternatively, the mechanical oil pump may be arranged in such a manner that the axis of the mechanical oil pump deviates from the axis of the engine, and the mechanical oil pump may be rotated by the engine via, for example, a parallel-shaft gear unit.

Usually, there is a lot of flexibility in the position of the electric oil pump. The electric oil pump may be provided in the oil in, for example, the transmission case. Unlike the mechanical oil pump, deterioration of the rising characteristics of the hydraulic pressure due to entry of the air into the pump is not caused. Even when the electric oil pump is at least partially above the oil level, the above-described problem does not occur if a seal member is provided to prevent entry of the air into the electric oil pump. The electric oil pump is used to obtain a predetermined amount of oil, for example, while the engine is stopped. When the engine is operating, a sufficient amount of oil is obtained by the mechanical oil pump. Accordingly, the operation of the electric oil may be stopped in order to enhance the fuel efficiency, when the engine is operating.

Hereafter, example embodiments of the invention will be described with reference to the accompanying drawings. FIG. 1 is a circuit diagram illustrating an oil supply system 50 for a vehicle according to a first embodiment of the invention. The oil supply system 50 includes a mechanical oil pump 54 that is driven by an engine 52, which serves as a drive power source for a vehicle, and an electric oil pump 58 that is driven by an electric motor 56 when necessary. The oil supply system 50 is suitable for, for example, a hybrid vehicle that includes a hybrid vehicle drive unit 10 shown in FIG. 19, and an eco-run vehicle in which the operation of the engine 52 is stopped when the vehicle is stopped.

Figure 19:
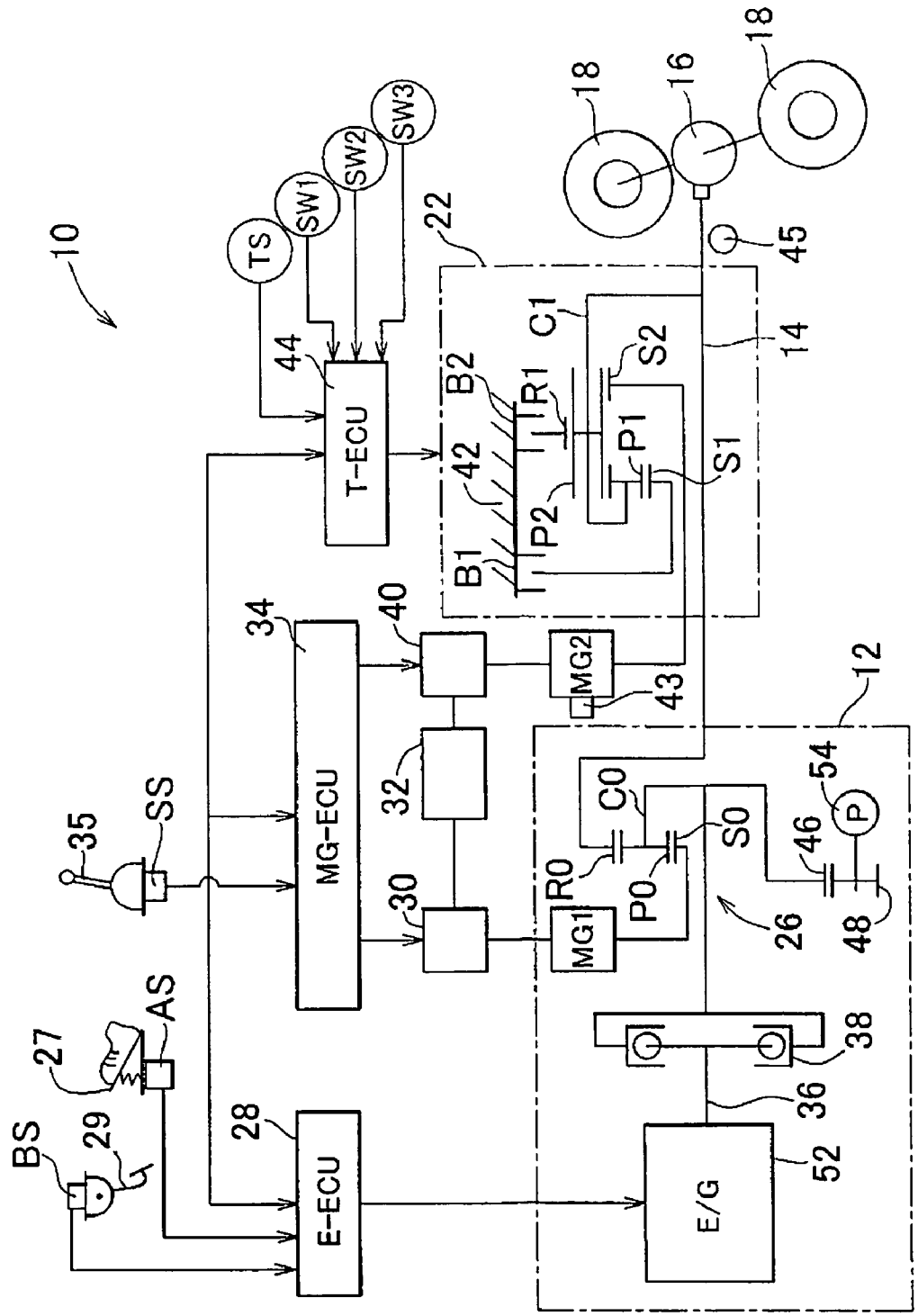
FIG. 19 is a schematic diagram showing a drive unit for a hybrid vehicle to which the oil supply system for a vehicle according to the invention is appropriately applied.

In the hybrid vehicle drive unit 10 in FIG. 19, torque from a first drive power generation source 12, which serves as a main drive power generation source, is transferred to an output shaft 14, which serves as an output member, and the torque is transferred from the output shaft 14 to paired right and left drive wheels 18 via a differential gear unit 16. In the hybrid vehicle drive unit 10, a second motor generator MG2 is provided as a second drive power generation source. The second motor generator MG2 selectively performs the power running operation for producing drive power used to move the vehicle and the regenerative operation for collecting energy. The second motor generator MG2 is connected to the output shaft 14 via an automatic transmission 22. Therefore, the capacity of the torque transferred from the second motor generator MG2 to the output shaft 14 is adjusted based on the gear ratio γs (=rotational speed NMG2 of MG2/rotational speed NOUT of output shaft 14) selected by the automatic transmission 22.

The automatic transmission 22 is structured to select one of the high gear H of which the gear ratio γs is higher than "1" and the low gear L of which the gear ratio γs is also higher than "1". When the second motor generator MG2 performs the power running operation to output the torque from the second motor generator MG2, the torque is increased at the low gear L and then transferred to the output shaft 14. Therefore, the capacity or the size of the second motor generator MG2 may be further reduced. When the rotational speed NOUT of the output shaft 14 is increased with an increase in the vehicle speed, the high gear H of which the gear ratio γs is lower than that of the low gear L, is selected to reduce the rotational speed NMG2 of the second motor generator MG2, whereby the motor efficiency of the second motor generator MG2 is appropriately maintained. On the other hand, when the rotational speed NOUT of the output shaft 14 is reduced, the low gear L of which the gear ratio γs is higher than that of the high gear H, is selected to increase the rotational speed NMG2 of the second motor generator MG2.

The first drive power generation source 12 is formed mainly of the engine 52; a first motor generator MG1, and a planetary gear mechanism 26 that combines the torque from the engine 52 and the torque from the motor generator MG1 together or splits the torque from the engine 52 into the torque transferred to the MG1 and the torque transferred to the drive wheels 18. The engine 52 is a known internal combustion engine, for example, a gasoline engine or a diesel engine, which burns fuel to produce drive power. The operating states of the engine 52, for example, the throttle valve opening amount, the intake air amount, the fuel supply amount, the ignition timing, etc. are electronically controlled by an electronic control unit for controlling an engine (hereinafter, referred to as "E-ECU") 28 that is formed mainly of a microcomputer. Detection signals from an accelerator pedal operation amount sensor AS that detects the operation amount Acc of an accelerator pedal 27, a brake sensor BS that determines whether a brake pedal 29 has been operated, etc. are transmitted to the E-ECU 28.

The first motor generator MG1 is, for example, a synchronous motor, and is structured to function as an electric motor that produces drive torque or an electric power generator. The first motor generator MG1 is connected to a storage unit 32, for example, a battery or a capacitor, via an inverter 30. An electronic control unit for controlling a motor generator (hereinafter, referred to as "MG-ECU") 34, which is formed mainly of a microcomputer, controls the inverter 30, whereby the output torque or the regenerative torque of the first motor generator MG1 is adjusted or set. Detection signals from an operation position sensor SS, which detects the position to which the shift lever 35 is operated, etc. are transmitted to the MG-ECU 34.

The planetary gear mechanism 26 is a known single-pinion planetary gear mechanism that produces a differential function. The planetary gear mechanism 26 includes three rotational elements, that is, a sun gear S0, a ring gear R0 that is arranged coaxially with the sun gear S0, and a carrier C0 that supports pinions P0 meshed with the sun gear S0 and the ring gear R0 in such a manner that the pinions P0 are allowed to rotate about their axes and turn around the sun gear S0. The planetary gear mechanism 26 is arranged coaxially with the engine 52 and the automatic transmission 22. Because the planetary gear mechanism 26 and the automatic transmission 22 are symmetric with respect to the central axis, the lower half portions thereof are not shown in FIG. 19.

In the first embodiment of the invention, a crankshaft 36 of the engine 52 is connected to the carrier C0 of the planetary gear mechanism 26 via a damper 38. The first motor generator MG1 is connected to the sun gear S0, and the output shaft 14 is connected to the ring gear R0. The carrier C0 serves as an input element, the sun gear S0 serves as a reaction force element, and the ring gear R0 serves as an output element. The manner in which the carrier C0, the sun gear S0 and the ring gear R0 are connected to each other may be changed as needed. In addition, a double-pinion planetary gear mechanism may be used as the planetary gear mechanism 26.

Figure 20:
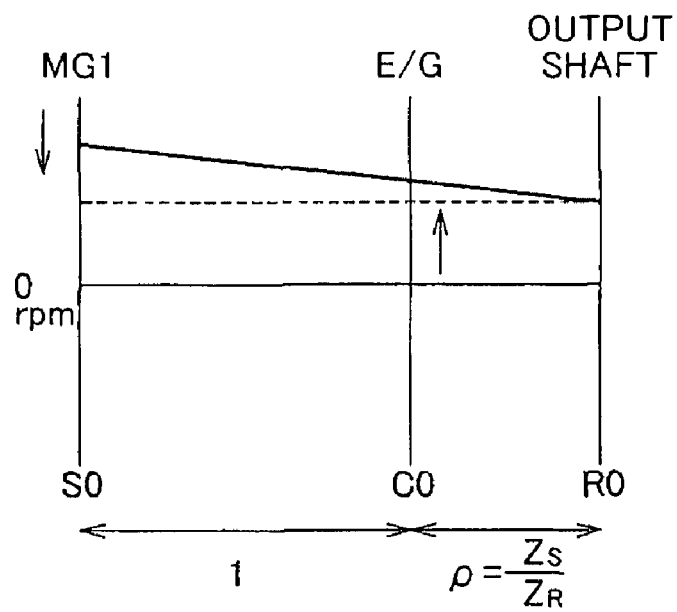
FIG. 20 is a collinear diagram illustrating the operation of a planetary gear mechanism provided in a first drive power generation source in the drive unit in FIG. 19.

The relative relationship among the rotational speeds of the rotational elements of the single-pinion planetary gear mechanism 26, which serves as the above-described torque combine-split mechanism, is shown in a collinear diagram in FIG. 20. In the collinear diagram, the ordinate axis S0, the ordinate axis C0, and the ordinate axis R0 represent the rotational speed of the sun gear S0, the rotational speed of the carrier C0, and the rotational speed of the ring gear R0, respectively. The distance between the ordinate axis S0 and the ordinate axis C0, and the distance between the ordinate axis C0 and the ordinate axis R0 are set in such a manner that when the distance between the ordinate axis S0 and the ordinate axis C0 is 1, the distance between the ordinate axis C0 and the ordinate axis R0 is the gear ratio $\rho$ (=number of teeth ZS of sun gear S0/number of teeth ZR of ring gear R0).

In the planetary gear mechanism 26, when the torque from the first motor generator MG1 is input in the sun gear S0 as the reaction torque for the torque TE which is output from the engine 52 and input in the carrier C0, the ring gear R0, which serves as the output element, outputs a torque higher than the torque. TE from the engine 52. In this case, the first motor generator MG1 serves as an electric power generator. When the rotational speed of the ring gear R0 (rotational speed of output shaft) NOUT is constant, the rotational speed NE of the engine 52 is continuously changed by adjusting the rotational speed NMG1 of the first motor generator MG1. The dashed line in FIG. 20 indicates the state in which the rotational speed NE of the engine 52 decreases when the rotational speed NMG1 of the first motor generator MG1 is decreased from the value indicated by the solid line. Namely, a control for setting the rotational speed NE of the engine 52 to a value at which the fuel efficiency is optimized is executed by controlling the first motor generator MG1. This type of hybrid drive system is called a mechanical split type drive system or a split type drive system.

Referring again to FIG. 19, a gear 46 is fitted to the carrier C0 of the planetary gear mechanism 26, and the mechanical oil pump 54 is connected to the gear 46 via a parallel shaft gear unit 48. When the engine 52 is operating, the mechanical oil pump 54 is constantly rotated mechanically by the engine 52 via these gears 46 and 48. In FIG. 19, the mechanical oil pump 54 is shown at a position below the axis of the engine 52. Alternatively, the mechanical oil pump 54 may be arranged at a position, for example, on the extension of the axis of the engine 52 or below the axis of the engine 52 depending on the manner in which the mechanical oil pump 54 is arranged in the vehicle. In this case, the mechanical oil pump 54 is entirely above an oil level 60 (see FIG. 1) of the oil (lubrication oil) in a transmission case (not shown) in which the planetary gear mechanism 26 and the automatic transmission 22 are housed. Alternatively, the mechanical oil pump 54 may be arranged at a position at which the mechanical oil pump 54 is partially above the oil level 60 of the oil (lubrication oil) in the transmission case.

The automatic transmission 22 is formed of a set of Lavigneaux planetary gear mechanism. That is, the automatic transmission 22 includes a first sun gear S1 and a second sun gear S2. Short pinions P1 mesh with the first sun gear S1, and the short pinions P1 mesh with long pinions P2 that are longer than the short pinions P1. The long pinions P2 mesh with a ring gear R1 that is arranged coaxially with the sun gears S1 and S2. The pinions P1 and P2 are supported by a shared carrier C1 in such a manner that the pinions P1 and P2 are allowed to rotate about their axes and turn around the sun gear S1. The second sun gear S2 meshes with the long pinions P2.

The second motor generator MG2 is controlled by the MG-ECU 34 via the inverter 40, whereby the second motor generator MG2 serves as an electric motor or an electric power generator and the powering torque or the regenerative torque is controlled. The second motor generator MG2 is connected to the second sun gear S2, and the carrier C1 is connected to the output shaft 14. The first sun gear S1 and the ring gear R1 together with the pinions P1 and P2 constitute a mechanism that corresponds to a double-pinion planetary gear mechanism. The second sun gear S2 and the ring gear R1 together with the long pinions P2 constitute a mechanism that corresponds to a single-pinion planetary gear mechanism.

The automatic transmission 22 includes a first brake B1 that selectively locks the first sun gear S1 and that is arranged between the first sun gear S1 and the a transmission housing 42, and a second brake B2 that selectively locks the ring gear R1 and that is arranged between the ring gear R1 and the transmission housing 42. These brakes B1 and B2 are so-called friction engaging devices that generate engagement force using frictional force. As the brakes B1 and B2, multi-disc engaging devices or band-type engaging devices may be employed. The brakes B1 and B2 are structured so that the torque capacities thereof are continuously controlled based on the engaging pressure generated by, for example, a hydraulic actuator.

The above-described automatic transmission 22 is structured so that the second sun gear S2 serves as an input element, the carrier C1 serves as an output element, the high gear H, of which the gear ratio γsh is higher than 1, is selected when the first brake B1 is engaged, and the low gear L, of which the gear ratio γsl is higher than the gear ratio γsh of the high gear H, is selected when the second brake B2 is engaged instead of the first brake B1. The gear of the automatic transmission 22 is changed between the high gear H and the low gear L based on the cruising state such as the vehicle speed V, the accelerator pedal operation amount Acc, and the required drive power Tv. More specifically, the gear ranges are set in a map (shift diagram) in advance, and a control is executed to select one of the gears based on the detected operating state. An electronic control unit for a gear-change control (hereinafter, referred to as "T-ECU") 44 that is formed mainly of a microcomputer is provided to execute this control.

Transmitted to the T-ECU 44 are detection signals from an oil temperature sensor TS that detects the oil temperature TOIL, a hydraulic pressure switch SW1 that detects the hydraulic pressure for engaging the first brake B1, a hydraulic pressure switch SW2 that detects the hydraulic pressure for engaging the second brake B2, a hydraulic pressure switch SW3 that detects the line pressure PL, etc. Further, transmitted to the T-ECU 44 are signals from a MG2 rotational speed sensor 43 that detects the rotational speed NMG2 of the second motor generator MG2, and an output shaft rotational speed sensor 45 that detects the rotational speed NOUT of the output shaft 14, which corresponds to the vehicle speed V.

Figure 21:
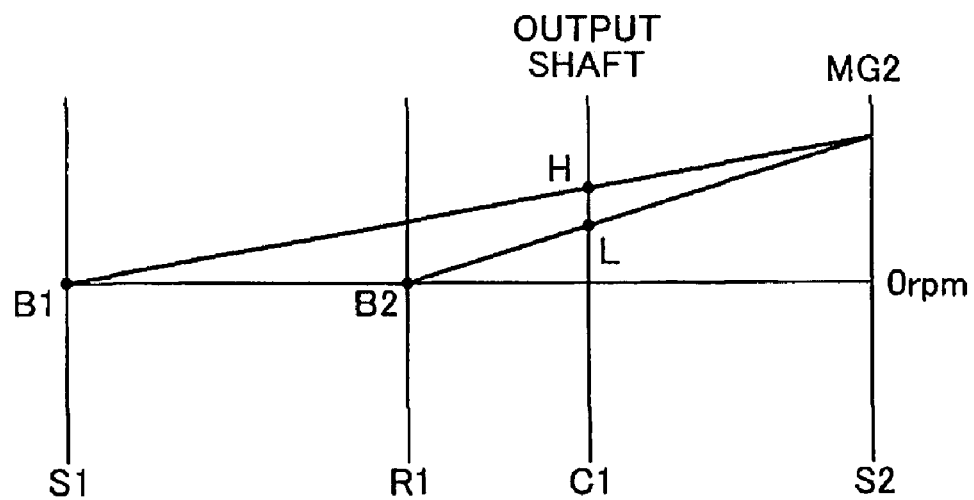
FIG. 21 is a collinear diagram illustrating a plurality of gears of an automatic transmission provided between a second motor generator MG2 and an output shaft in the drive unit in FIG. 19.

FIG. 21 is a collinear diagram having four ordinate axes S1, R1, C1 and S2 that indicate the relative relationship among the rotational elements of the Ravigneaux planetary gear mechanism that forms the automatic transmission 22. The ordinate axes S1, R1, C1 and S2 represent the rotational speed of the first sun gear S1, the rotational speed of the ring gear R1, the rotational speed of the carrier C1, and the rotational speed of the second sun gear S2, respectively.

In the thus structured automatic transmission 22, when the ring gear R1 is locked by the second brake B2, the low gear L is selected, and the powering torque output from the second motor generator MG2 is amplified based on the gear ratio γsl, and the amplified torque is then applied to the output shaft 14. On the other hand, when the first sun gear S1 is locked by the first brake B1, the high gear H, of which the gear ratio γsh is lower than the gear ratio γsl of the low gear L, is selected. Because the gear ratio γsh of the high gear is also higher than "1", the powering torque output from the second motor generator MG2 is amplified based on the gear ratio γsh, and the amplified torque is then applied to the output shaft 14.

For example, when a key is inserted into a key slot and then a power switch is turned on with the brake pedal 29 depressed, the control units 28, 34 and 44 are activated. In this way, the hybrid vehicle drive unit 10 is brought into the active state in which the engine 52, the first motor generator MG1 and the second motor generator MG2 can be driven. Then, the drive power Tv required by the driver (hereinafter, referred to as "required drive power Tv") is calculated based on the accelerator pedal operation amount Acc, vehicle speed V, etc., and the torque produced by the first drive power generation source 12 and/or the torque produced by the second motor generator MG2 are/is controlled so that the required drive power Tv is obtained. The cruise mode is changed, based on the cruising state, among the assist cruise mode, vehicle start/acceleration mode, the motor-power cruise mode, the charging cruise mode, and the engine-power cruise mode. In the assist cruise mode, the engine 52 is operated to produce the drive power in such a manner that the engine characteristic is on the optimum fuel efficiency curve, and a shortfall with respect to the required drive power Tv is covered by the torque produced by the second motor generator MG2. In the vehicle start/acceleration mode, when the required drive power Tv is increased, namely, when the vehicle is required to start or accelerate, the output torque TE produced by the engine 52 and the regenerative braking torque regenerated by the first motor generator MG1 are both increased to increase the torque output from the first drive power generation source 12 and the powering torque TMG2 output from the second motor generator MG2. In the motor-power cruise mode, the engine 52 is stopped and only the second motor generator MG2 is used as the drive power source. In the charging cruise mode, the vehicle travels using the second motor generator MG2 as the drive power source while the first motor generator MG1 generates electric power using the power from the engine 52. In the engine-power cruise mode, the drive power from the engine 52 is mechanically transferred to the drive wheels 18 and the vehicle travels using the drive power.

The T-ECU 44 selects a gear of the automatic transmission 22 based on the actual vehicle speed V and the actual accelerator pedal operation amount Acc using a prescribed shift diagram (shift map) that uses, for example, the vehicle speed V and the accelerator pedal operation amount Acc as parameters. Then, the T-ECU 44 controls the first brake B1 and the second brake B2 to change the gear to the selected gear.

Referring again to FIG. 1, the mechanical oil pump 54 and the electric oil pump 58 shares an inlet port 62, and are connected to an oil intake passage 66 and an oil intake passage 68, respectively, which join into one passage at a junction point 64. The mechanical oil pump 54 and the electric oil pump 58 suck the oil, which has been returned to an oil pan 70 provided below the transmission case, up through the inlet port 62, and discharge the oil to an oil discharge passage 72 and an oil discharge passage 74, respectively. The oil discharge passages 72 and 74 join into one passage at a junction point 76, and supply oil to a hydraulic pressure control circuit 78. In order to enhance the oil supply efficiency when the oil is supplied to the hydraulic pressure control circuit 78 by only one of the oil pumps 54 and 56, check valves 80 and 82, which permit oil flows toward the junction point 76 but block back flows toward the oil pumps 54 and 58, are arranged in the oil discharge passages 72 and 74, at positions upstream of the junction point 76, respectively.

The hydraulic pressure control circuit 78 includes, for example, a regulator valve that produces, for example, the line pressure PL. An operation control oil passage 84 that supplies oil, which has a predetermined relatively high pressure and which is used to engage the brakes B1 and B2 of the automatic transmission 22, is connected to the hydraulic pressure control circuit 78. In addition, a lubrication/cooling oil passage 86 that supplies oil, which has a relatively low pressure and which is used to lubricate or cool various portions, is connected to the hydraulic pressure control circuit 78. The operation control oil passage 84 and the lubrication/cooling oil passage 86 are formed separately from each other, and, for example, a regulator valve is arranged between the operation control oil passage 84 and the lubrication/cooling oil passage 86. The hydraulic pressure in the operation control oil passage 84 is controlled independently of the hydraulic pressure in the lubrication/cooling oil passage 86.

Figure 2:
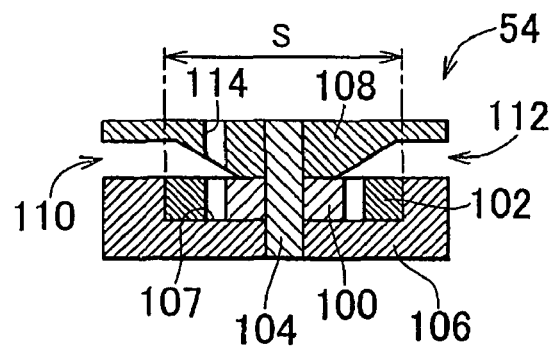
FIG. 2 is a cross-sectional view schematically showing a mechanical oil pump according to the first embodiment of the invention.

FIG. 2 is a cross-sectional view schematically showing an example of the mechanical oil pump 54. In this case, an internal gear pump is used as the mechanical oil pump 54. The mechanical oil pump 54 includes an external gear 100, and an internal gear 102 that is eccentrically arranged on the outer peripheral side of the external gear 100, that is partially meshed with the external gear 100, and that is rotated eccentrically with respect to the external gear 100. The parallel shaft gear unit 48 is fitted to a shaft 104 that is splined to the external gear 100. With this structure, the mechanical oil pump 54 is rotated by the engine 52. The external gear 100 and the internal gear 102 are housed in a recess 107 formed in a case 106 that is formed of, for example, the transmission case. A cover 108 is fixed integrally with the case 106 with, for example, bolts, whereby a pump chamber is formed. An inlet port 110 and a discharge port 112, which communicate with the pump chamber, are formed. The oil intake passage 66 is connected to the mechanical oil pump 54 so as to communicate with the inlet port 110, and the oil discharge passage 72 is connected to the mechanical oil pump 54 so as to communicate with the discharge port 112.

The mechanical oil pump 54 is entirely or partially above the oil level 60 of the oil in the transmission case. Therefore, while the vehicle is left unused for a long time or while the engine 52 is stopped, the oil may leak through, for example, a gap between the case 106 and the cover 108 and air may enter the pump chamber through the gap. In contrast, there is a lot of flexibility in the position of the electric oil pump 58. In the first embodiment of the invention, the electric oil pump 58 is arranged so as to be entirely soaked in the oil in the transmission case. Therefore, the air does not enter the electric oil pump 58, unlike the mechanical oil pump 54. The electric oil pump 58 is used to obtain a predetermined amount of oil while the engine 52 is stopped. When the engine 52 is operating, a sufficient amount of oil is obtained by the mechanical oil pump 54. Therefore, the operation of the electric oil pump 58 is stopped to enhance the fuel efficiency, when the engine 52 is operating.

Figure 22:
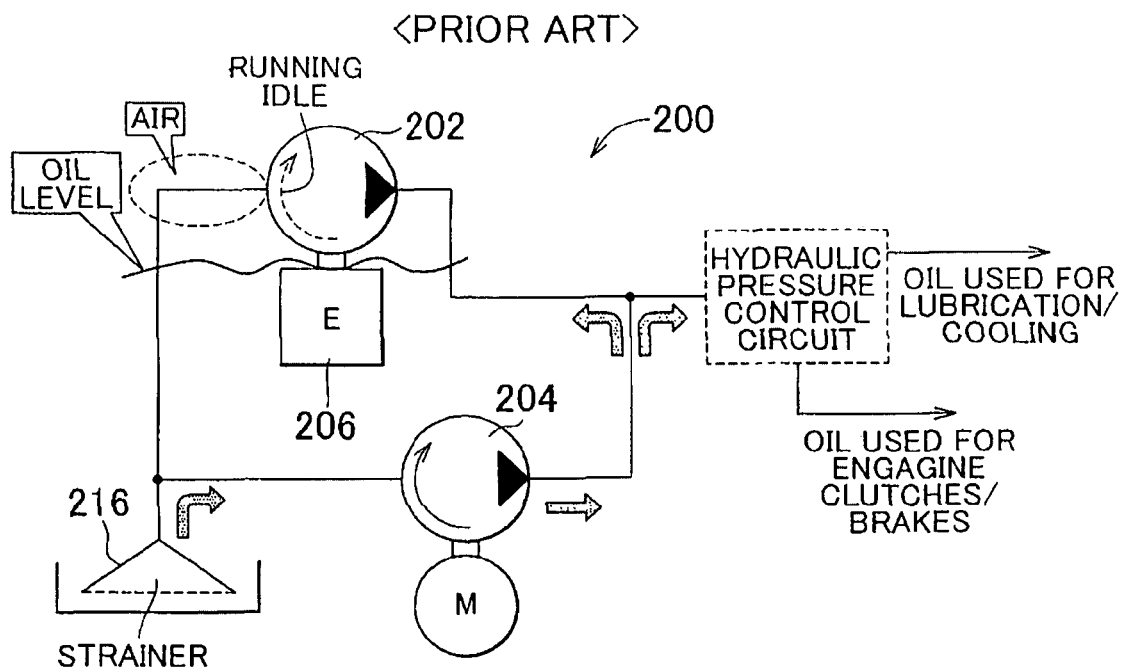
FIG. 22 is a circuit diagram illustrating an example of a conventionally-used oil supply system for a vehicle.
Figure 23:
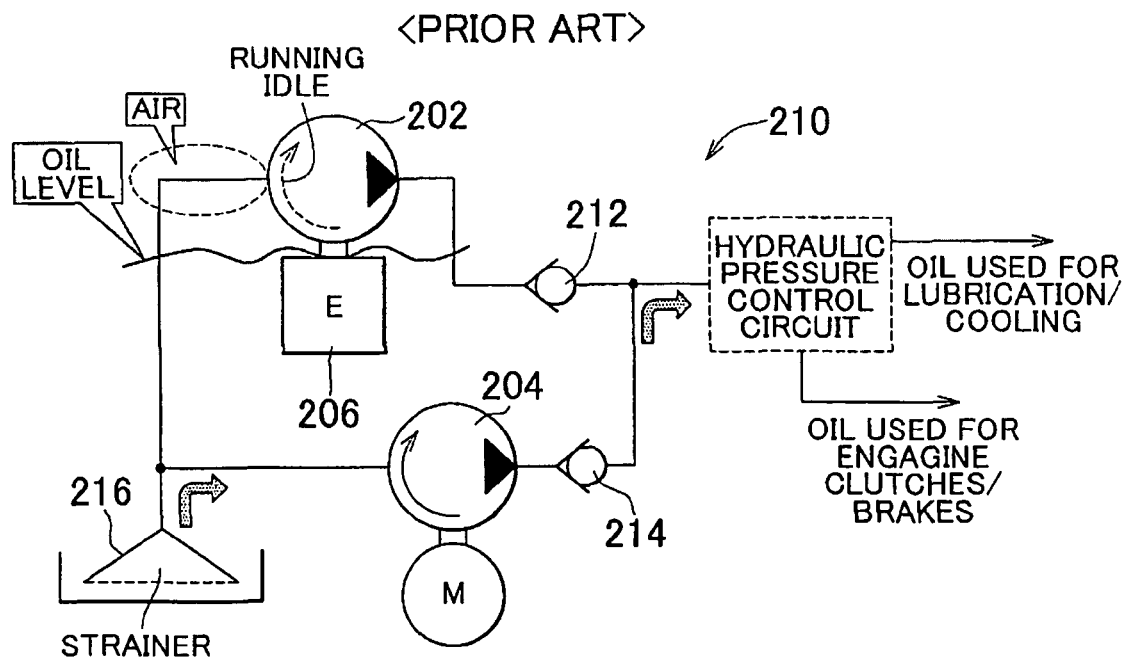
FIG. 23 is a circuit diagram illustrating another example of a conventionally-used oil supply system for a vehicle.

In the hybrid vehicle drive unit 10 according to the first embodiment of the invention, when the control units 28, 34 and 44 are activated in response to an operation for turning the power switch on, only the electric oil pump 58 is operated first to obtain a predetermined amount of oil. Then, the engine 52 is started in response to an operation of the accelerator pedal. However, if the air has entered the mechanical oil pump 54 because, for example, the vehicle is left unused for a long time, the hydraulic pressure output from the mechanical oil pump 54 does not exhibit appropriate rising characteristics due to presence of the air, as in the case shown in FIG. 22. Then, the time at which the electric oil pump 58 is stopped due to activation of the operation of the mechanical oil pump 54 is retarded, which reduces the fuel efficiency. Especially, in the first embodiment of the invention, the check valve 80 is provided in the oil discharge passage 72 for the mechanical oil pump 54. The check valve 80 is kept closed by the hydraulic pressure from the electric oil pump 58. Therefore, as in the case shown in FIG. 23, the air remains in the mechanical oil pump 54, and therefore the mechanical oil pump runs idle, which further deteriorates the rising characteristics of the hydraulic pressure from the mechanical oil pump 54.

In the motor-power cruise mode in which the engine 52 is stopped and the vehicle travels using only the second motor generator MG2 as the drive power source, the electric oil pump 58 is operated to supply the oil to the hydraulic pressure control circuit 78, whereby the oil used to lubricate or cool the various portions is obtained and the hydraulic pressure for engaging the brake B1 or B2 of the automatic transmission is produced. In this case as well, the air may enter the mechanical oil pump 54 due to a vacuum pressure produced by the operation of the electric oil pump 58. This deteriorates the rising characteristics of the hydraulic pressure output from the mechanical oil pump 54 when the engine 52 is restarted and the cruise mode is changed to the engine-power cruise mode or the vehicle start/acceleration mode, as in the above-described case.

Figure 24:
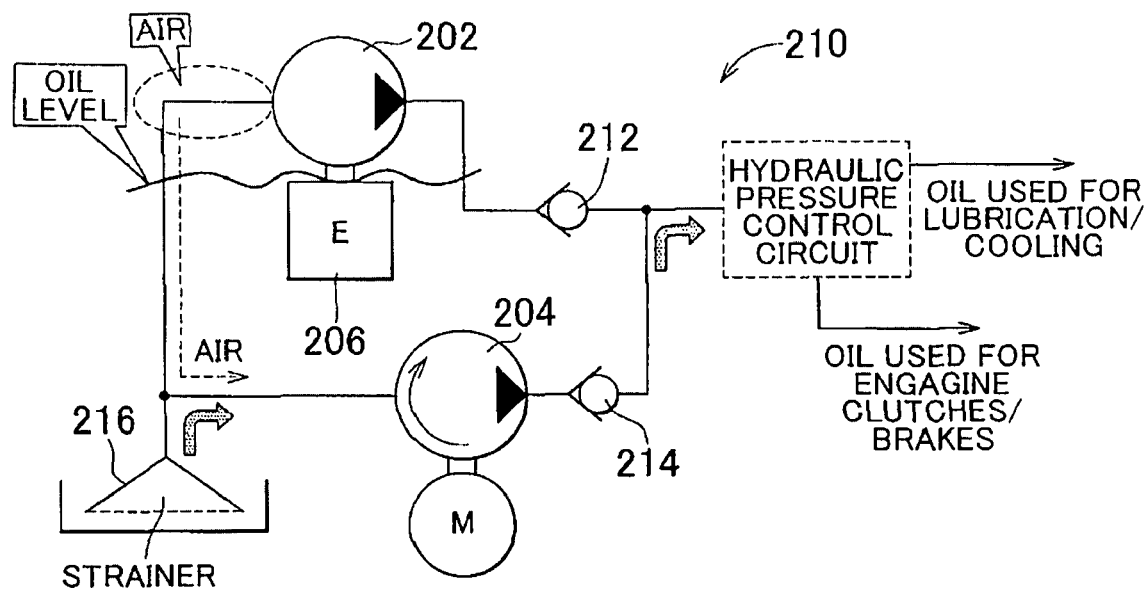
FIG. 24 is a view illustrating an air flow when air-sucking noise is caused in the oil supply system for a vehicle in FIG. 23.

If only the electric oil pump 58 is operated while the engine 52 is stopped, the electric oil pump 58 may suck the air, which has entered the mechanical oil pump 54, and therefore air-sucking noise may be caused, as in the case shown in FIG. 24.

To reduce such air-sucking noise, a seal member, for example, a gasket may be arranged between the case 106 and the cover 108 to prevent entry of the air into the mechanical oil pump 54. However, it is difficult to reliably prevent entry of the air into the mechanical oil pump 54. In addition, if such seal member is provided, the number of components increases, which causes cost increase. Further, the configuration becomes more complicated, which makes assembly work more cumbersome.

Therefore, according to the first embodiment of the invention, a communication passage 90 is formed between the lubrication/cooling oil passage 86 and the mechanical oil pump 54 as shown in FIG. 1, and the oil in the lubrication/cooling oil passage 86 is introduced to the mechanical oil pump 54. A pilot hydraulic pressure opening/closing valve 92 is provided, as a blocking device, in the communication passage 90. In addition, a throttle valve 96 is provided between an oil passage-side port 94, at which the communication passage 90 is connected to the lubrication/cooling oil passage 86, and the opening/closing valve 92. The pilot hydraulic pressure opening/closing valve 92 changes the oil-flow state between the oil-flow permitted state and the oil-flow blocked state using the hydraulic pressure in the oil discharge passage 72 for the mechanical oil pump 54 as a pilot hydraulic pressure. When the mechanical oil pump 54 is not operating and the hydraulic pressure in the oil discharge passage 72 is low, the oil-flow permitted state is selected and an oil flow through the communication passage 90 is permitted. In contrast, when the mechanical oil pump 54 is driven in accordance with the operation of the engine 52 and the hydraulic pressure in the oil discharge passage 72 becomes high, the oil-flow blocked state is selected and the communication passage 90 is blocked. As a result, an oil flow through the communication passage 90 is blocked. Because the throttle valve 96 is provided in the communication passage 90, it is possible to prevent unnecessarily large amount of oil from flowing from the lubrication/cooling oil passage 86 toward the mechanical oil pump 54.

A pump-side port 98 of the communication passage 90 is connected to a connection portion of the oil intake passage 66 or of the mechanical pump 54, which is close to the inlet port 110 of the mechanical oil pump 54. The connection portion is closer to the mechanical oil pump 54 than the junction point 64, and closer to the mechanical oil pump 54 than the halfway point of the oil passage that extends between the mechanical oil pump 54 and the electric oil pump 58 and that passes the junction point 64. In other words, the position of the connection portion is set in such a manner that the distance L1 between the mechanical oil pump 54 and the connection portion is shorter than the distance L2 between the electric oil pump 58 and the connection portion (L1<L2).

For example, as shown in FIG. 1, the pump-side port 98 of the communication passage 90 is connected to the intake passage 66. Alternatively, the pump-side port 98 may be connected directly to the mechanical oil pump 54d at a position in the range in which the pump-side port 98 overlaps the mechanical oil pump 54. More specifically, as shown in FIG. 2, a communication hole 114 that communicates with the inlet port 110 may be formed in, for example, the cover 108 at a position within the overlap range S, and the pump-side port 98 may be connected to the communication hole 114. The overlap range S is the same as the range of the recess 107 that forms the pump chamber.

Figure 3:
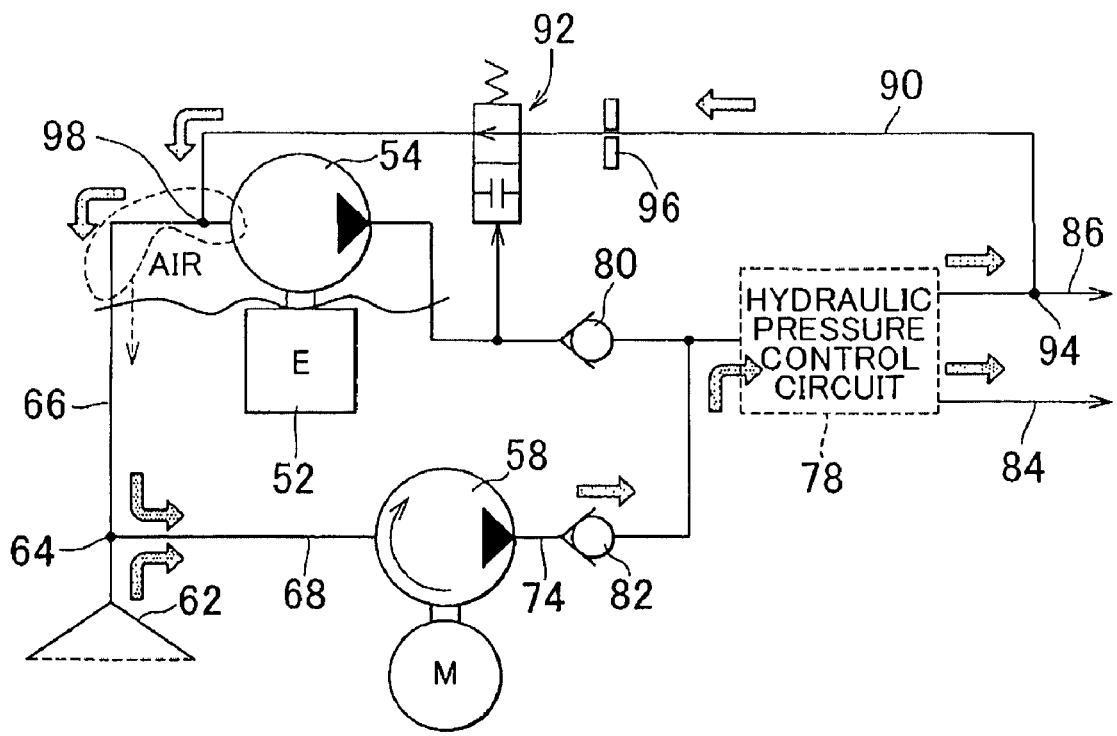
FIG. 3 is a view which illustrates the effects of the first embodiment of the invention, and in which an oil flow is indicated by arrows.

In the oil supply system 50 for a vehicle according to the first embodiment of the invention, the communication passage 90 through which the oil in the lubrication/cooling oil passage 86 is introduced to the inlet port side of the mechanical oil pump 54 is formed. Therefore, when the electric oil pump 58 is actuated in response to an operation for turning the power switch on, the oil is supplied from the lubrication/cooling oil passage 86 to the inlet port side of the mechanical oil pump 54 through the communication passage 90 as indicated by the arrows that show the oil flow in FIG. 3. Thus, the air which is accumulated in the mechanical oil pump 54 while the vehicle is left unused for a long time is removed promptly. That is, the air which is accumulated in the mechanical oil pump 54 is mixed with the oil supplied from the lubrication/cooling oil passage 86 and flows back toward the junction point 64 through the oil intake passage 66. The air is then sucked into the oil intake passage 68 by a vacuum pressure produced by the electric oil pump 58, and delivered to the hydraulic pressure control circuit 78 from the electric oil pump 58 through the oil discharge passage 74.

Even when the engine 52 is stopped, for example, when the motor-power cruise mode is selected, the oil is supplied from the lubrication/cooling oil passage 86 to the inlet port side of the mechanical oil pump 65 through the communication passage 90 as described above in accordance with the operation of the electric oil pump 58. Therefore, it is possible to prevent entry of the air into the mechanical oil pump 54 due to, for example, a vacuum pressure produced in accordance with the operation of the electric oil pump 58.

As described above, the air which is accumulated in the mechanical oil pump 54, for example, while the vehicle is left unused for a long time is promptly removed in accordance with the operation of the electric oil pump 58. In addition, the air does not enter the mechanical oil pump 54 even when the engine 52 is stopped, for example, when the motor-power cruise mode is selected. Therefore, when the engine 52 is started, for example, when the engine-power cruise mode or the vehicle start/acceleration mode is selected, the hydraulic pressure output from the mechanical oil pump 54 exhibits appropriate rising characteristics. Accordingly, the electric oil pump 58 is stopped promptly in response to the actuation of the mechanical oil pump 54. As a result, the fuel efficiency is enhanced.

When the engine 52 is stopped, for example, when the motor-power cruise mode is selected, the air does not enter the mechanical oil pump 54. Therefore, it is possible to avoid the situation in which the electric oil pump 58 sucks the air and therefore air-sucking noise is caused. The air, which is accumulated in the mechanical oil pump 54, for example, while the vehicle is left unused for a long time, is mixed with the oil supplied from the lubrication/cooling oil passage 86 and then moved toward the electric oil pump 58. Therefore, air-sucking noise is suppressed as compared with the case in which the air in the mechanical oil pump 54 is sucked into the electric oil pump 58, without being mixed with the oil, through the oil intake passage 66 and the oil intake passage 68.

The oil in the lubrication/cooling oil passage 86 is introduced into the mechanical oil pump 54. Accordingly, the hydraulic pressure in the operation control oil passage 84, which is used for the gear-change control over the automatic transmission 22, is not influenced. Therefore, the gear-change control is executed at high accuracy.

As shown in FIG. 2, when the pump-side port 98 of the communication passage 90 is directly connected to the mechanical oil pump 54 at a position within the range S in which the pump-side port 98 overlaps the mechanical oil pump 54, it is possible to supply the oil directly into the pump chamber of the mechanical oil pump 54 to promptly remove the air from the mechanical oil pump 54. In addition, it is possible to fill the pump chamber with the oil up to the position at which the pump-side port 98 is connected to the mechanical oil pump 54. Accordingly, the amount of air in the mechanical oil pump 54 is minimized. As a result, the hydraulic pressure output from the mechanical oil pump 54 during startup of the engine 52 exhibits further appropriate rising characteristics.

In the first embodiment of the invention, the opening/closing valve 92, which blocks an oil flow when the mechanical oil pump 54 is driven, is provided in the communication passage 90. Therefore, it is possible to avoid the situation in which the oil circulates through the communication passage 90 when the mechanical oil pump 54 is driven, which enhances the oil supply efficiency. Especially, in the first embodiment of the invention, because the pilot hydraulic pressure opening/closing valve 92 is used, the communication passage 90 is reliably blocked when the mechanical oil pump 54 is driven. In addition, the pilot hydraulic pressure opening/closing valve 92 is smaller in size and lower in cost than a solenoid opening/closing valve. Further, a control for changing the oil-flow state is not necessary, if the pilot hydraulic pressure opening/closing valve 92 is used.

In the first embodiment of the invention, the throttle valve 96 is provided between the opening/closing valve 92 and the oil passage-side port 94 to prevent unnecessarily large amount of oil from flowing from the lubrication/cooling oil passage 86 toward the mechanical oil pump 54. Therefore, the influence on lubrication and cooling performance is small. Accordingly, it is not necessary to increase the amount of oil discharged from the electric oil pump 58 to cover a shortfall in the oil caused by unnecessary outflow of the oil from the communication passage 90. Even if it is necessary to increase the amount of oil discharged from the electric oil pump 58, an amount of increase is kept to the minimum.

Next, a second embodiment of the invention will be described. The elements in the second embodiment that are substantially the same as those in the first embodiment will be denoted by the same reference numerals, and the detailed description thereof will not be provided below.

Figure 4:
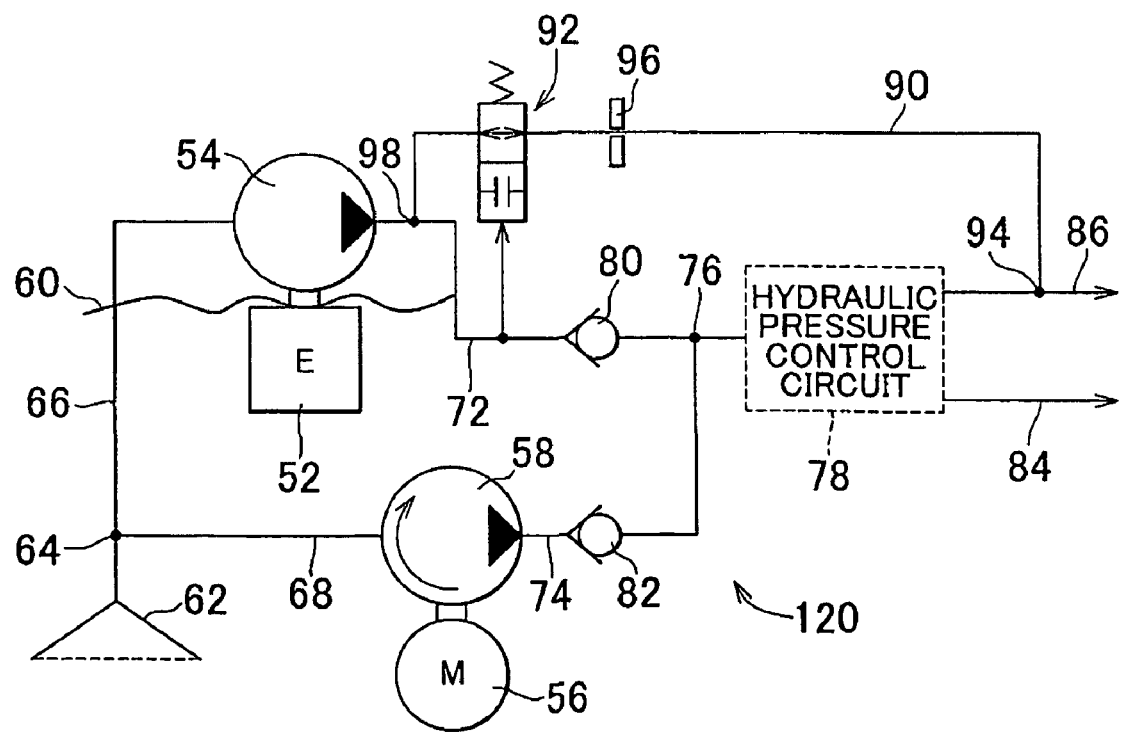
FIG. 4 is a circuit diagram showing an oil supply system for a vehicle according to a second embodiment of the invention.

In an oil supply system 120 for a vehicle in FIG. 4, the pump-side port 98 of the communication passage 90 is connected to a connection portion of the oil discharge passage 72, which is close to the discharge port 112 of the mechanical oil pump 54. For example, the pump-side port 98 is connected to the connection portion of the oil discharge passage 72, which is closer to the mechanical oil pump 54 than the check valve 80, and which is close to the discharge port 112 of the mechanical oil pump 54. Alternatively, a communication hole that communicates with the discharge port 112 may be formed in, for example, the cover 108 at a position within the overlap range S in which the pump-side port 98 overlaps the mechanical oil pump 54, and the pump-side port 98 may be connected to the communication hole.

In this case, when the electric oil pump 58 is actuated in response to an operation for turning the power switch on, the oil is supplied from the lubrication/cooling oil passage 86 to the discharge port side of the mechanical oil pump 54 through the communication passage 90, whereby the air which is accumulated in the mechanical oil pump 54 while the vehicle is left unused for a long time is removed from the mechanical oil pump 54 promptly. That is, the oil supplied from the lubrication/cooling oil passage 86 flows to the oil intake passage 66 through the pump chamber of the mechanical oil pump 54 due to, for example, a vacuum pressure produced by the electric oil pump 58. The air accumulated in the mechanical oil pump 54 is mixed with the oil, sucked from the oil intake passage 66 into the oil intake passage 68 through the junction point 64, and then delivered from the electric oil pump 58 to the hydraulic pressure control circuit 78 through the oil discharge passage 74.

When the engine 52 is stopped, for example, when the motor-power cruise mode is selected, the oil is supplied from the lubrication/cooling oil passage 86 to the discharge port side of the mechanical oil pump 54 through the communication passage 90 in accordance with the operation of the electric oil pump 58, as described above. Therefore, it is possible to avoid the situation in which the air enters the mechanical oil pump 54 due to a vacuum pressure produced in accordance with the operation of the electric oil pump 58.

As described above, the air, which is accumulated in the mechanical oil pump 54, for example, while the vehicle is left unused for a long time, is removed promptly in accordance with the operation of the electric oil pump 58, and the air does not enter the mechanical oil pump 43 even when the engine 52 is stopped, for example, when the motor-power cruise mode is selected. Therefore, the oil supply system 120 according to the second embodiment of the invention produces the effects that are the same as those produced by the oil supply system 50 according to the first embodiment of the invention. For example, when the engine 52 is started because the engine-power cruise mode or the vehicle start/acceleration mode is selected, the hydraulic pressure output from the mechanical oil pump 54 exhibits appropriate rising characteristics.

In addition, according to the second embodiment of the invention, the communication passage 90 is connected to the connection portion close to the discharge port 112 of the mechanical oil pump 54. Therefore, even if the air remains in the mechanical oil pump 54 when the engine 52 is started because the engine-power cruise mode or the vehicle start/acceleration mode is selected, the air is promptly discharged to the communication passage 90 in accordance with the operation of the mechanical oil pump 54. Accordingly, the hydraulic pressure output from the mechanical oil pump 54 exhibits appropriate rising characteristics despite presence of the check valve 80. More specific description is provided below. Because the hydraulic pressure in the communication passage 90 is low, even if the hydraulic pressure output from the mechanical oil pump 54 is too low to open the check valve 80, the oil flows into the communication passage 90, and the air is discharged into the communication passage 90 together with the oil. When the hydraulic pressure output from the mechanical oil pump 54 increases to a certain degree after the air is discharged into the communication passage 90, the opening/closing valve 92 is closed. Therefore, the flow of the oil into the communication passage 90 is blocked and the hydraulic pressure abruptly increases. Then, the check valve 80 is opened and oil supply to the hydraulic pressure control circuit 78 is started.

Next, a third aspect of the invention will be described. An oil supply system 124 for a vehicle in FIG. 5 differs from the oil supply system 50 for a vehicle in FIG. 1 in that a bypass oil passage 126, which extends in parallel with the lubrication/cooling oil passage 86, is formed, a jet pump 128 is provided in the bypass oil passage 126, and the oil passage-side port 94 of the communication passage 90 is connected to the jet pump 128. The jet pump 128 is a suction device that mechanically sucks the oil from the communication passage 90 using the energy that is generated when the oil flows through the bypass oil passage 126. As shown in FIG. 6, the jet pump 128 includes a nozzle 130 that gradually reduces the flow passage area of the bypass oil passage 126, a small-flow passage area portion 132 that is formed near the end of the nozzle 130, a reverse taper-shaped diffuser 134 in which the flow passage area is gradually increased from the small-flow passage area portion 132, and an intake passage 136 that is formed around the outer periphery of the nozzle 130 and that opens at the small-flow passage area portion 132. The jet pump 128 sucks the oil through the intake passage 136 using a negative pressure that is generated when the oil, of which the flow rate is increased by the nozzle 130, passes the opening of the intake passage 136. The small-flow passage area portion 132 and the diffuser 134 are directly formed in a block 138. The nozzle 130 that is formed separately from the block 138 is fitted into the block 138, whereby the intake passage 136 is formed around the nozzle 130. The oil passage-side port 94 of the communication passage 90 is connected to a communication hole 139 which is formed in the block 138 in such a manner that the oil passage-side port 94 communicates with the intake passage 136. The oil and the air present on the side of the mechanical oil pump 54 are sucked into the jet pump 128 through the communication hole 139 and the communication passage 90. The bypass oil passage 126 is a part of the lubrication/cooling oil passage 86.

In the third embodiment of the invention, a check valve 140, which permits an oil flow from the mechanical oil pump 54 toward the jet pump 128 but blocks an oil flow from the jet pump 128 toward the mechanical oil pump 54, is provided in the communication passage 90 as a blocking device instead of the pilot hydraulic pressure opening/closing valve 92. The pump-side port 98 of the communication passage 90 is connected to a connection portion of the oil intake passage 66 or of the mechanical oil pump 54, which is close to the inlet port 10, at a position above the oil level 60 of the oil in the transmission case.

In the oil supply system 124 for a vehicle, the jet pump 128 is provided in the bypass oil passage 126 that extends in parallel with the lubrication/cooling oil passage 86, and the oil is sucked into the jet pump 128 through the communication passage 90. Therefore, when the electric oil pump 58 is actuated in response to an operation for turning the power switch on, the oil and the air on the inlet port side of the mechanical oil pump 54 are sucked into the jet pump 128 through the communication passage 90. As a result, the air, which is accumulated in the mechanical oil pump 54 while the vehicle is left unused for a long time, is removed from the mechanical oil pump 54 promptly. Also, even when the engine 52 is stopped, for example, when the motor-power cruise mode is selected, the electric oil pump 58 is operated and the oil flows through the lubrication/cooling oil passage 86, whereby the oil on inlet port side of the mechanical oil pump 54 is sucked into the jet pump 128 through the communication passage 90. Therefore, it is possible to avoid the situation in which the air enters the mechanical oil pump 54 through a gap and remains in the mechanical oil pump 54.

As described above, the air, which is accumulated in the mechanical oil pump 54 while the vehicle is left unused for a long time, is removed promptly in accordance with the operation of the electric oil pump 58. In addition, even when the engine 52 is stopped, for example, when the motor-power cruise mode is selected, the situation in which the air enters the mechanical oil pump 54 and remains therein is not caused. Therefore, the oil supply system 124 according to the third embodiment of the invention produces the effects that are the same as those produced by the oil supply system 50 according to the first embodiment of the invention. For example, when the engine 52 is started because the engine-power cruise mode or the vehicle start/acceleration mode is selected, the hydraulic pressure output from the mechanical oil pump 54 exhibits appropriate rising characteristics.

In addition, according to the third embodiment of the invention, the oil is mechanically sucked into the jet pump 128 through the communication passage 90 using the energy produced when the oil flows through the bypass oil passage 126. Accordingly, the system is reduced in configuration complexity, cost and size, as compared with the case where, for example, an electric suction pump is provided. The jet pump 128 including the nozzle 130, the small-flow passage area portion 132, the diffuser 134 and the intake passage 136 is used. Accordingly, even when the flow rate of the oil in the bypass oil passage 126 is relatively low, the jet pump 128 exhibits a high suction performance by increasing the flow speed of the oil using the nozzle 130. Therefore, it is possible to appropriately remove the air from the mechanical oil pump 54.

Figure 7:
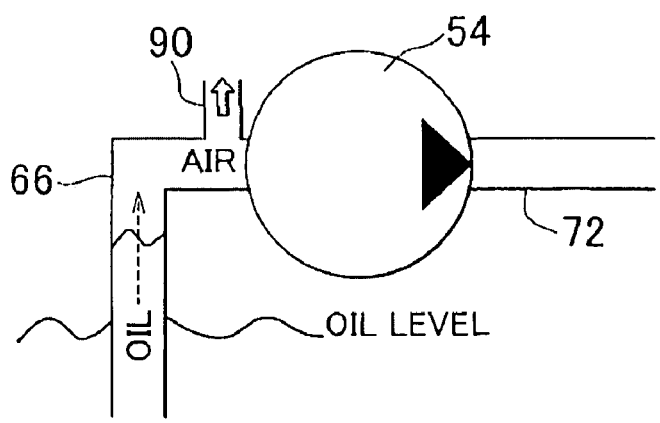
FIG. 7 is a view illustrating the effect of raising the oil level in an oil intake passage in the third embodiment of the invention.

In the third embodiment of the invention, the pump-side port 98 of the communication passage 90 is connected to the connection portion of the oil intake passage 66 or of the mechanical oil pump 54, which is close to the inlet port 110, at a position above the oil level 60 of the oil in the transmission case. Therefore, it is possible to appropriately suck and remove the air that has entered the mechanical oil pump 54 and to fill the mechanical oil pump 54 with the oil by raising the oil level of the oil in the oil intake passage 66, as shown in FIG. 7.

Figure 8:
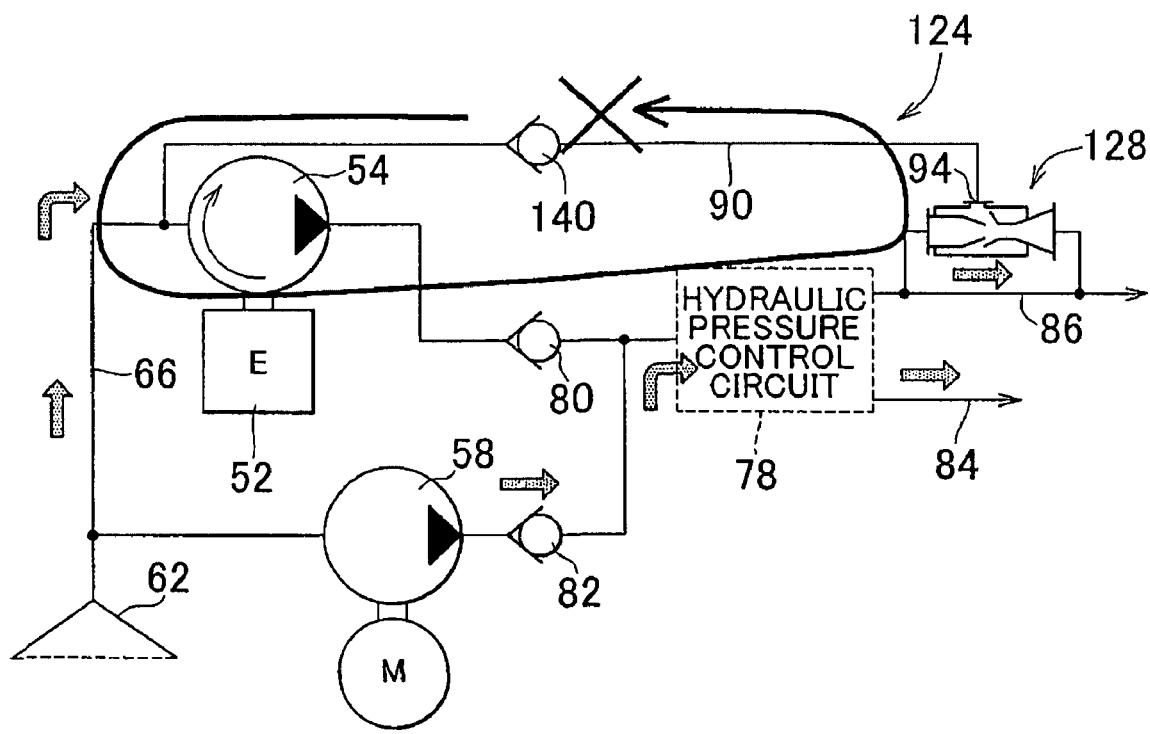
FIG. 8 is a view illustrating the effect of blocking oil circulation using a check valve when the mechanical oil pump is driven in the third embodiment of the invention.

In addition, the check valve 140, which permits an oil flow from the mechanical oil pump 54 toward the jet pump 128 but blocks an oil flow from the jet pump 128 toward the mechanical oil pump 54, is provided in the communication passage 90. Therefore, as shown in FIG. 8, it is possible to avoid the situation in which, when the mechanical oil pump 54 is driven, for example, when the engine-power cruise mode or the vehicle start/acceleration mode is selected, the oil flows from the communication passage 90 toward the mechanical oil pump 54 due to a vacuum pressure produced by the mechanical oil pump 54. As a result, the oil supply efficiency is enhanced. In the third embodiment of the invention, the check valve 140 is used. Therefore, the system is reduced in configuration complexity, cost and size, as compared with the case where the pilot-hydraulic pressure opening/closing valve 92 is used.

Figure 9:
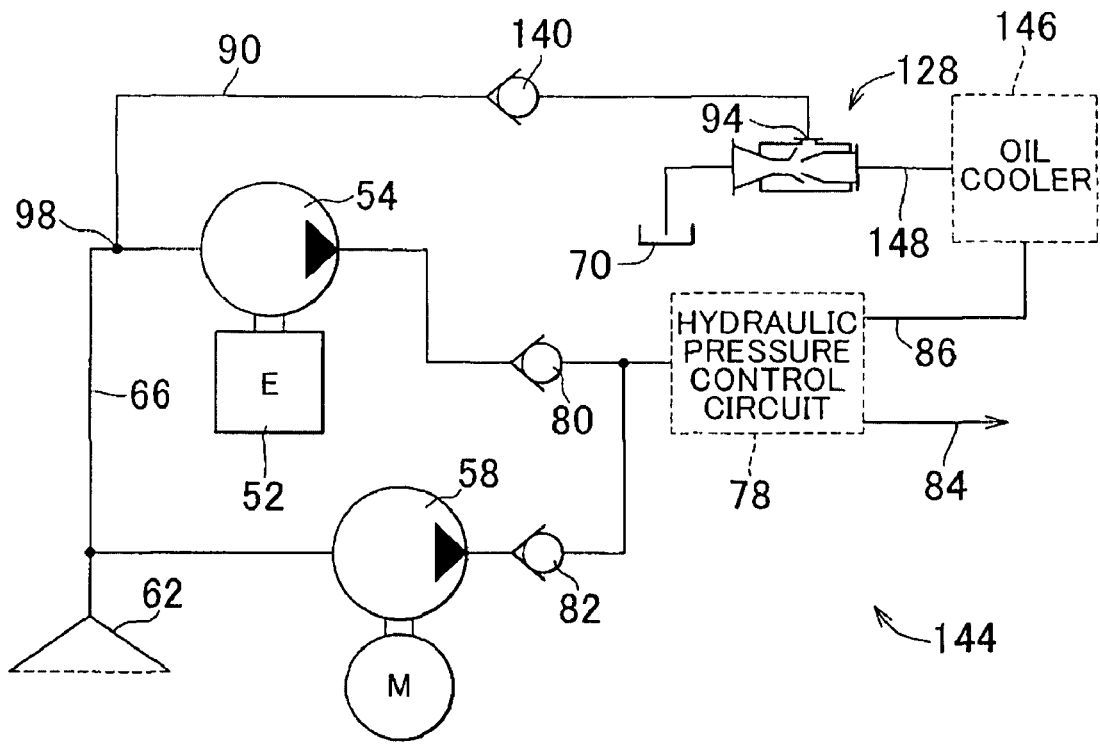
FIG. 9 is a circuit diagram showing an oil supply system for a vehicle according to a fourth embodiment of the invention.

Next, a fourth embodiment of the invention will be described. An oil supply system 144 for a vehicle in FIG. 9 differs from the oil supply system 124 for a vehicle in FIG. 5 in that the jet pump 128 is provided in a return oil passage 128 that extends from an oil cooler 126. The oil supply system 144 produces the effects same as those produced by the oil supply system 124 in FIG. 9. The return oil passage 148 is also a part of the lubrication/cooling oil passage 86.

Figure 10:
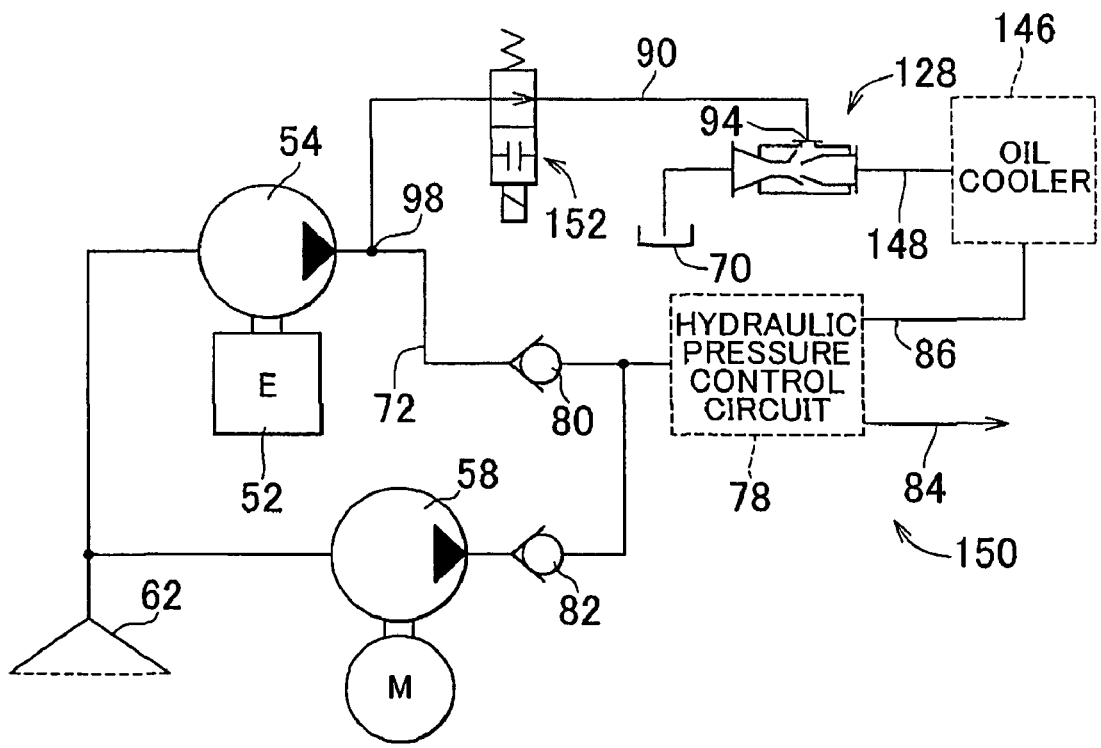
FIG. 10 is a circuit diagram showing an oil supply system for a vehicle according to a fifth embodiment of the invention.

Next, a fifth embodiment of the invention will be described. An oil supply system 150 for a vehicle in FIG. 10 differs from the oil supply system 144 for a vehicle in the fourth embodiment of the invention in FIG. 9 in that the pump-side port 98 of the communication passage 90 is connected to a connection portion of the oil discharge passage 72 for the mechanical oil pump 54 or of the mechanical oil pump 54, at a position close to the discharge port 112. As in the case shown in FIG. 4, the pump-side port 98 is connected to the oil discharge passage 72, at a position closer to the mechanical oil pump 54 than the check valve 80 and close to the discharge port 112 of the mechanical oil pump 54. Alternatively, the pump-side port 98 may be connected to the mechanical oil pump 54 itself. In addition, a solenoid opening/closing valve 152, instead of the check valve 140, is provided in the communication passage 90 as a blocking device. When the engine 52 is stopped, the solenoid opening/closing valve 152 opens to permit an oil flow and an air flow through the communication passage 90. On the other hand, when the engine 52 is operating, that is, when the mechanical oil pump 54 is driven, the solenoid opening/closing valve 152 is closed to block an oil flow and an air flow through the communication passage 90.

Therefore, in the fifth embodiment of the invention as well, when the engine 52 is stopped, the air in the mechanical oil pump 54 is sucked into the jet pump 128 through the communication passage 90 and removed from the mechanical oil pump 54. Accordingly, the oil supply system 144 according to the fifth embodiment of the invention produces the effects same as those produced by the oil supply system 124 according to the third embodiment in FIG. 5 and the oil supply system 144 in the fourth embodiment in FIG. 9. When the engine 52 is operating, the solenoid opening/closing valve 152 is closed under the electronic control to block an oil flow and an air flow through the communication passage 90. Accordingly, it is possible to prevent the oil discharged from the mechanical oil pump 54 from flowing from the communication passage 90 directly to the return oil passage 148. As a result, it is possible to maintain the appropriate oil supply efficiency despite presence of the communication passage 90.

Figure 11:
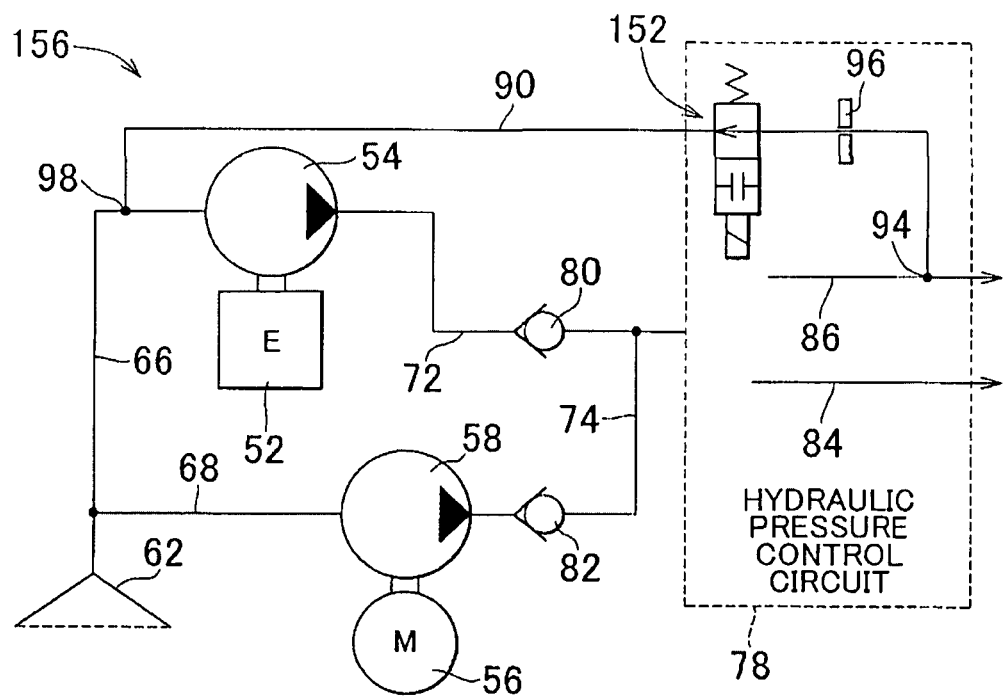
FIG. 11 is a circuit diagram showing an oil supply system for a vehicle according to a sixth embodiment of the invention.

Next, a sixth embodiment of the invention will be described. An oil supply system 156 for a vehicle in FIG. 11 differs from the oil supply system 50 for a vehicle in the first embodiment of the invention in FIG. 1 in that the solenoid opening/closing valve 152 is employed instead of the pilot hydraulic pressure opening/closing valve 92, and the solenoid opening/closing valve 152 and the throttle valve 96 are embedded in the hydraulic pressure control circuit 78. More specifically, the oil passage-side port 94 of the communication passage 90 is connected to the lubrication/cooling oil passage 86 in, for example, a valve body in which the regulator valve, etc. are integrally fitted, and the solenoid opening/closing valve 152 and the throttle valve 96 are integrally fitted in the valve body. As in the fifth embodiment of the invention shown in FIG. 10, the solenoid opening/closing valve 152 opens when the engine 52 is stopped to permit an oil flow and an air flow through the communication passage 90. On the other hand, when the engine 52 is operating, namely, when the mechanical oil pump 54 is driven, the solenoid opening/closing valve 152 is closed to block an oil flow and an air flow through the communication passage 90.

Although the sixth embodiment of the invention differs from the first embodiment of the invention in that the opening/closing state of the solenoid opening/closing valve 152 needs to be changed under the electronic control, the oil supply system 156 according to the sixth embodiment of the invention produces the effects same as those produced by the oil supply system 50 according to the first embodiment of the invention. In the oil supply system 120 for a vehicle according to the second embodiment of the invention in FIG. 4 as well, the solenoid opening/closing valve 152 may be employed instead of the pilot hydraulic pressure opening/closing valve 92, and embedded in the hydraulic pressure control circuit 78.

Figure 12:
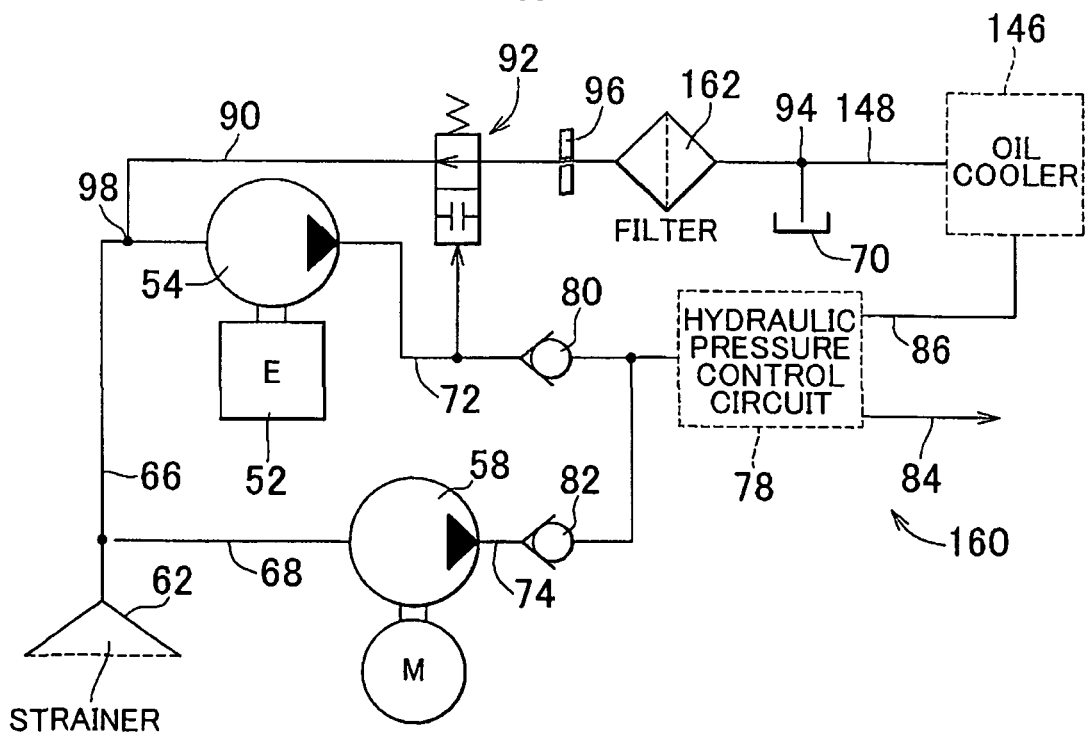
FIG. 12 is a circuit diagram showing an oil supply system for a vehicle according to a seventh embodiment of the invention.

Next, a seventh embodiment of the invention will be described. An oil supply system 160 for a vehicle in FIG. 12 differs from the oil supply system 50 in FIG. 1 in that the oil passage-side port 94 of the communication passage 90 is connected to the return oil passage 148 and a filter 162 is arranged between the oil passage-side port 94 and the throttle valve 96. The oil supply system 160 according to the sixth embodiment of the invention produces the same effects as those produced by the oil supply system 50 according to the first embodiment of the invention. This structure, in which the oil passage-side port 94 is connected to the return oil passage 148, may also be employed in the oil supply system 120 for a vehicle according to the second embodiment of the invention in FIG. 4.

Figure 13:
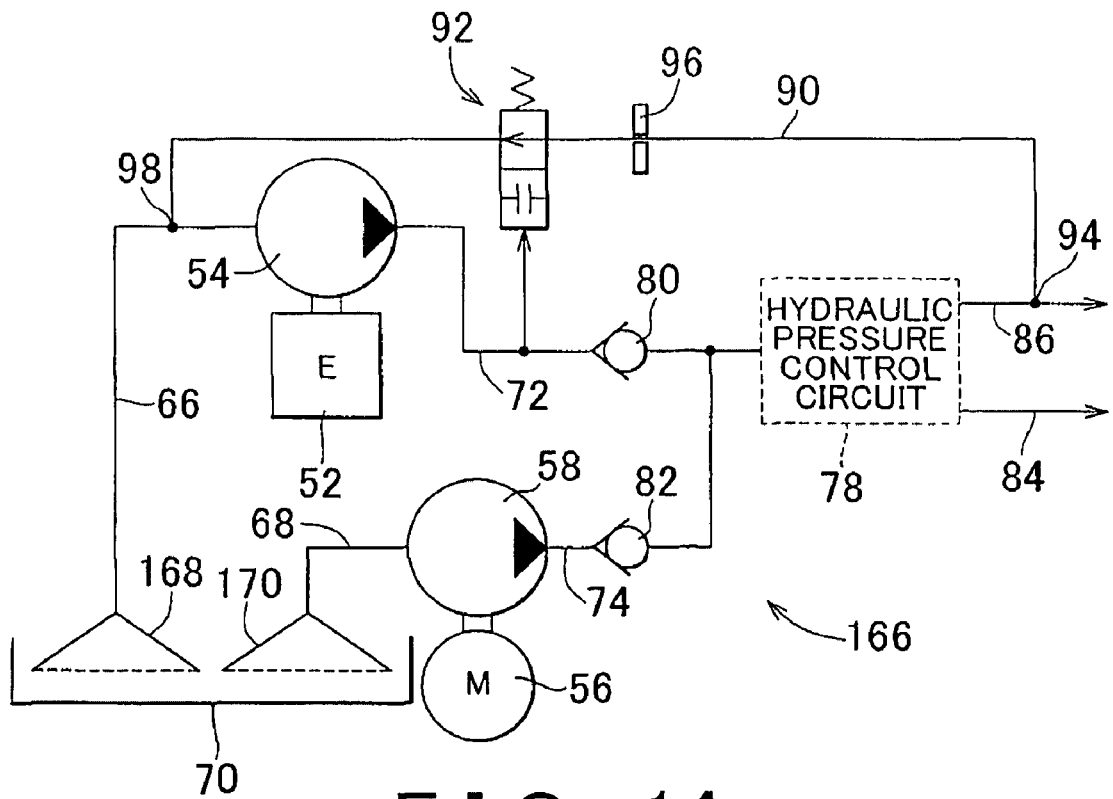
FIG. 13 is a circuit diagram showing an oil supply system for a vehicle according to an eighth embodiment of the invention.

Next, an eighth embodiment of the invention will be described. An oil supply system 166 for a vehicle according to the eighth embodiment of the invention shown in FIG. 13 differs from the oil supply system 50 for a vehicle according to the first embodiment of the invention shown in FIG. 1 in that the oil intake passage 66 for the mechanical oil pump 54 and the oil intake passage 68 for the electric oil pump 58 have an inlet 168 and an inlet 170, respectively. In this case, there is no possibility that, when the engine 52 is stopped, for example, when the motor-power cruise mode is selected, the air in the mechanical oil pump 54 is sucked into the electric oil pump 58 and therefore air-sucking noise is caused. However, the oil supply system 166 produces other effects than prevention of air-sucking noise, which are produced by the oil supply system 50 according to the first embodiment of the invention in FIG. 1. For example, because the air in the mechanical oil pump 54 is removed through the communication passage 90, the hydraulic pressure output from the mechanical oil pump 54 exhibits appropriate rising characteristics. In the other embodiments of the invention such as the second embodiment of the invention shown in FIG. 4, the oil intake passage 66 for the mechanical oil pump 54 and the oil intake passage 68 for the electric oil pump 58 may have the inlet 168 and the inlet 170, respectively.

Figure 14:
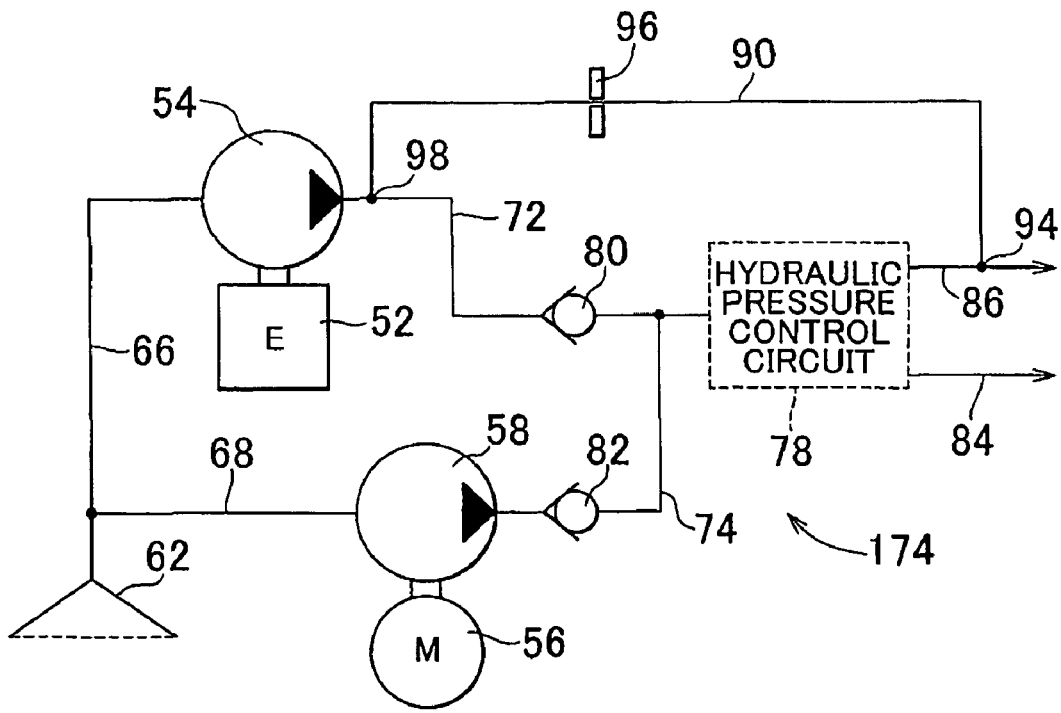
FIG. 14 is a circuit diagram showing an oil supply system for a vehicle according to a ninth embodiment of the invention.

Next, a ninth embodiment of the invention will be described. An oil supply system 174 for a vehicle in the ninth embodiment of the invention shown in FIG. 14 differs from the oil supply system 120 for a vehicle according to the second embodiment of the invention in FIG. 4 in that the pilot hydraulic pressure opening/closing valve 92 is not provided. However, the oil supply system 174 according to the ninth embodiment of the invention produces the same effects as those produced by the oil supply system 120 according to the second embodiment of the invention. More specifically, the air, which is accumulated in the mechanical oil pump 54 while the vehicle is left unused for a long time, is removed promptly in accordance with the operation of the electric oil pump 58. In addition, even when the engine 52 is stopped, for example, when the motor-power cruise mode is selected, the air does not enter the mechanical oil pump 54. Further, if the air remains in the mechanical oil pump 54 when the engine 52 is started because the engine-power cruise mode or the vehicle start/acceleration mode is selected, the air is discharged to the communication passage 90 promptly in accordance with the operation of the mechanical oil pump 54. However, in the ninth embodiment of the invention, even when the hydraulic pressure output from the mechanical oil pump 54 increases, a part of the oil is discharged to the communication passage 90. Therefore, as compared with the second embodiment of the invention, the hydraulic pressure output from the mechanical oil pump 54 exhibits less appropriate rising characteristics and the efficiency of supplying the oil to the hydraulic control 78 is reduced.

Figure 15:
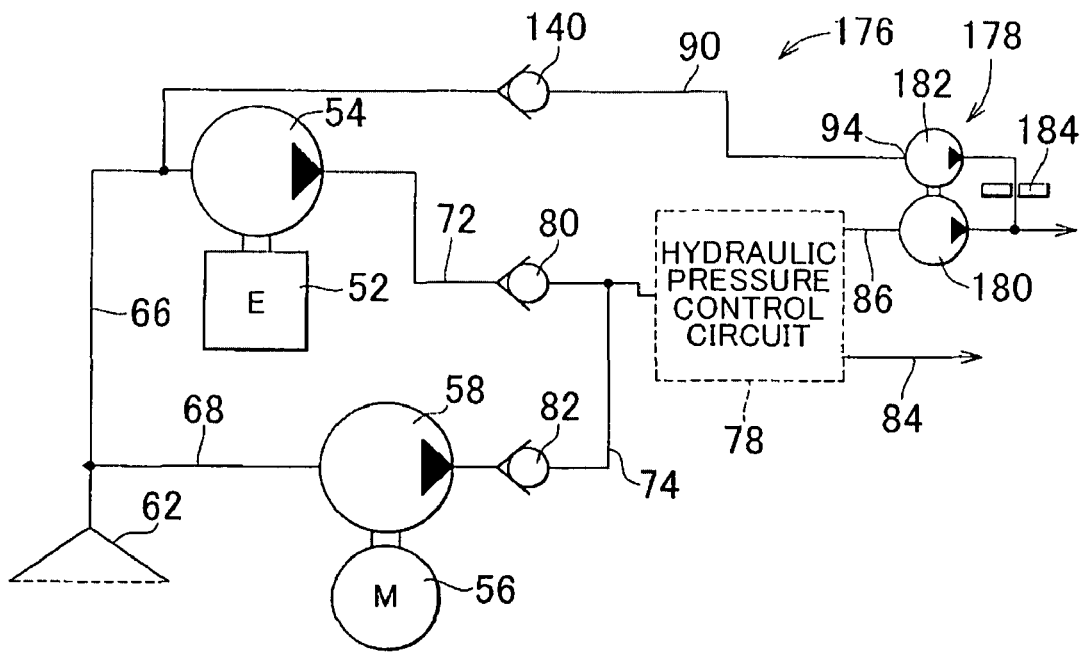
FIG. 15 is a circuit diagram showing an oil supply system for a vehicle according to a tenth embodiment of the invention.

Next, a tenth embodiment of the invention will be described. An oil supply system 176 for a vehicle according to the tenth embodiment of the invention shown in FIG. 15 differs from the oil supply system 124 for a vehicle according to the third embodiment of the invention in FIG. 5 in that a hydraulic oil pump 178, instead of the jet pump 128, is provided in the lubrication/cooling oil passage 86, and the pump-side port 94 of the communication passage 90 is connected to the hydraulic oil pump 178. The hydraulic oil pump 178 corresponds to a suction device that sucks the oil from the communication passage 90 using a flow of the oil through the lubrication/cooling oil passage 86. The hydraulic oil pump 178 includes a hydraulic motor 180 that is provided in the lubrication/cooling oil passage 86, and a pump 182 that is mechanically rotated by the hydraulic motor 180. The oil passage-side port 94 of the communication passage 90 is connected to an inlet port of the pump 182. A discharge port of the pump 182 is connected to the lubrication/cooling oil passage 86 at a connection portion downstream of the hydraulic motor 180. A throttle valve 184 is provided between the discharge port of the pump 182 and the connection portion. The oil supply system 176 according to the tenth embodiment of the invention produces the same effects as those produced by the oil supply system 124 according to the third embodiment of the invention.

Figure 5:
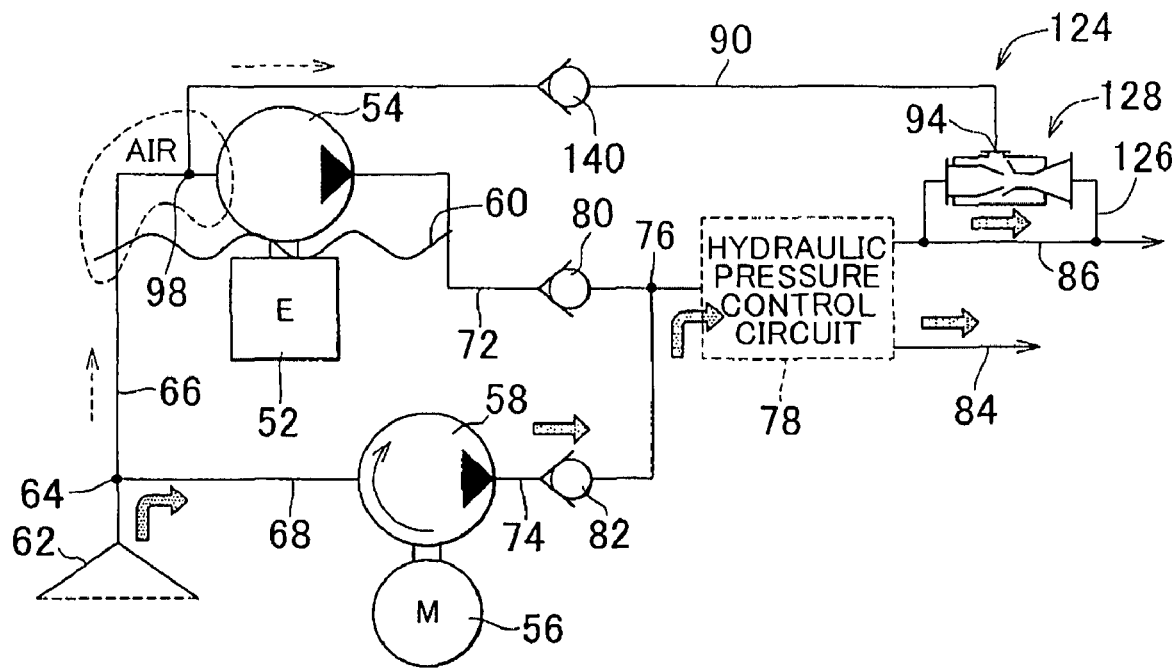
FIG. 5 is a circuit diagram showing an oil supply system for a vehicle according to a third embodiment of the invention.
Figure 6:
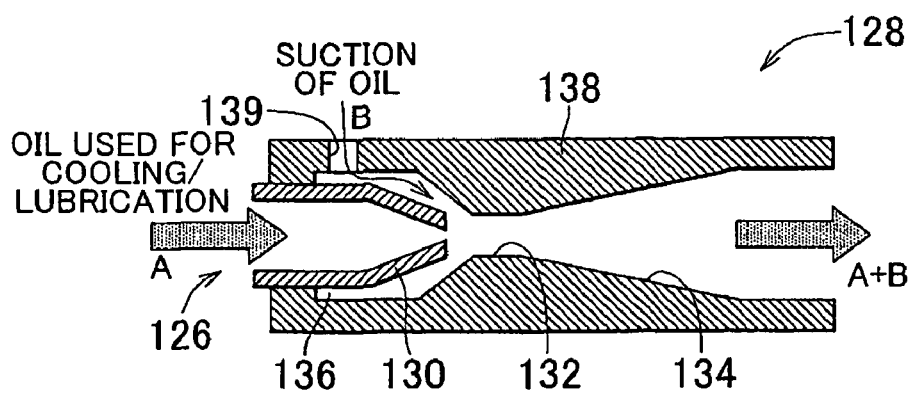
FIG. 6 is a cross-sectional view showing a jet pump according to the third embodiment of the invention.
Figure 16:
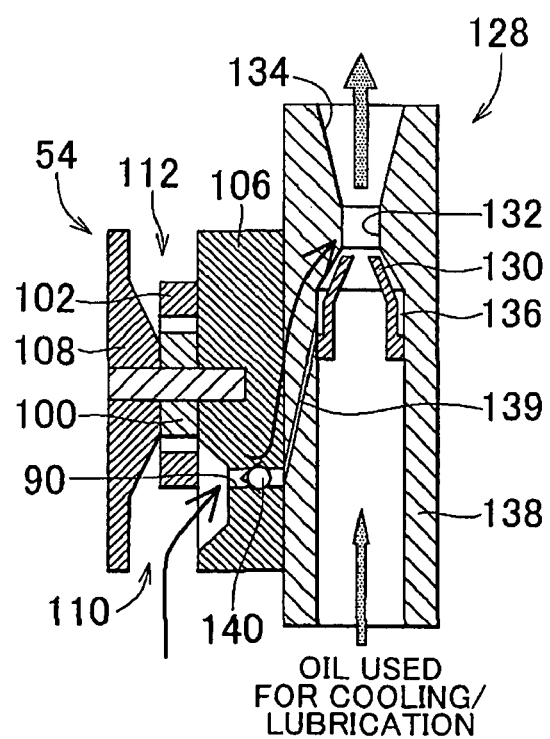
FIG. 16 is a cross-sectional view showing concrete examples of the mechanical oil pump, the jet pump, and a communication passage formed between the mechanical oil pump and the jet pump in the third embodiment of the invention shown in FIG. 5.

FIG. 16 is a view showing concrete examples of the mechanical oil pump 54, the jet pump 128 and the communication passage 90 formed between the mechanical oil pump 54 and the jet pump 128 in the oil supply system 124 for a vehicle according to the third embodiment of the invention shown in FIG. 5. The block 138 of the jet pump 128 and the case 106 of the mechanical oil pump 54 are provided integrally with each other. The communication passage 90 is formed of a through-hole that is formed in the case 106 so that the inlet port 110 of the mechanical oil pump 54 and the communication hole 139 of the jet pump 128 are communicated with each other. The check valve 140 is provided in the through-hole. The communication hole 139 extends obliquely from an upper stream-side communication portion (corresponding to the oil passage-side port 94), at which the communication hole 139 communicates with the communication passage 90, to a lower stream-side communication portion, at which the communication hole 139 communicates with the intake passage 136. The air and the oil in the mechanical oil pump 54 are appropriately sucked into the jet pump 128 through the communication hole 139 under suction of the jet pump 128. In this case, a pipe, etc. is not required to form the communication passage 90. Therefore, the oil supply system is reduced in size.

Figure 17:
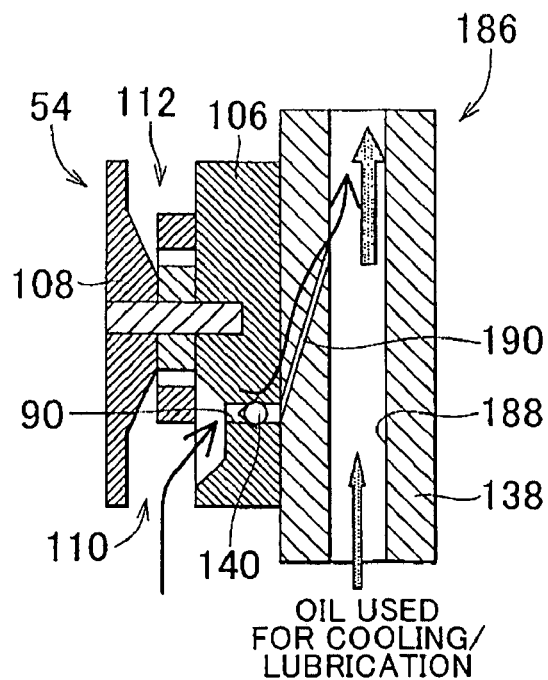
FIG. 17 is a cross-sectional view which illustrates a jet pump according to a modified example, and which corresponds to FIG. 16.

A jet pump 186 in FIG. 17 shows a modified example of the third embodiment of the invention. An oblique oil passage 190, which extends obliquely in the same manner in which the communication hole 139 extends, is formed as an intake passage so as to communicate with a passage 188 which is formed in the block 138 and which has a substantially constant cross section. With the jet pump 186 as well, suction effects are obtained by an oil flow through the passage 188, and the air and the oil in the mechanical oil pump 54 are sucked from the communication passage 90 into the passage 188 through the oblique oil passage 190. The passage 188 forms a part of the bypass oil passage 126.

Figure 18:
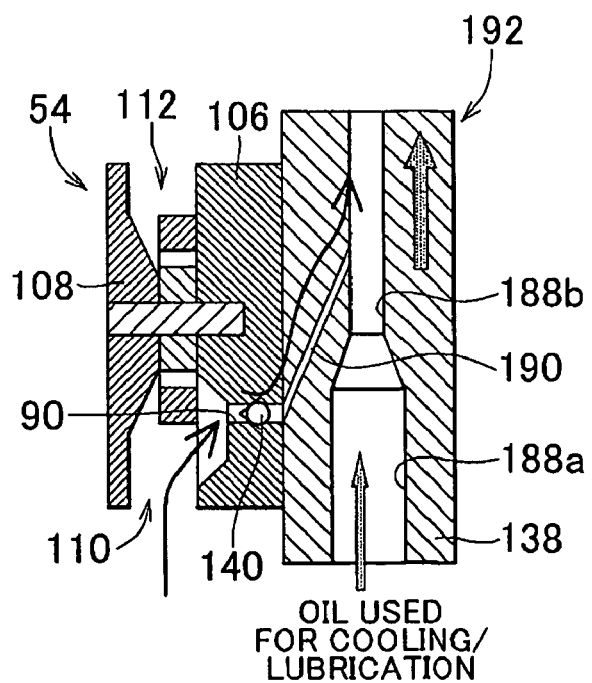
FIG. 18 is a cross-sectional view which illustrates a jet pump according to another modified example, and which corresponds to FIG. 16.

A jet pump 192 in FIG. 18 shows another modified example of the third embodiment of the invention. Unlike the jet pump 186, the cross section of the passage 188 is changed at its middle portion. The passage 188 has a large-diameter passage 188a formed on the upstream side and a small-diameter passage 188b formed on the downstream side, which is connected to the large-diameter passage 188a via a taper portion of which the diameter gradually decreases toward the small-diameter passage 188b. The oblique oil passage 190 opens at the inner peripheral face of the small-diameter passage 188b. In this case, the flow-rate of the oil is increased by decreasing the diameter of the passage 188. Therefore, the suction performance of the jet pump 192 is higher than that of the jet pump 186 in FIG. 17.

In the first, third, fourth, sixth to eighth and tenth embodiments of the invention, the pump-side port of the communication passage is connected to the connection portion which is close to the inlet port of the mechanical oil pump. When one inlet port is shared by the mechanical oil pump and the electric oil pump and the oil intake passage branches off into two oil intake passages at the junction point, preferably, the connection portion is closer to the mechanical oil pump than the junction point. In addition, preferably, the connection portion is closer to the mechanical oil pump than the halfway point of the oil passage that extends between the mechanical oil pump and the electric oil pump and that passes the junction point. The pump-side port may be connected to the case or the cover that forms the mechanical oil pump at a position within the overlap range, in which the pump-side port overlaps the mechanical oil pump, and the communication passage may be directly formed in the case or the cover so that the pump-side port communicates directly with the inlet port of the mechanical oil pump.

In the second, fifth and ninth embodiments of the invention, the pump-side port of the communication passage is connected to the connection portion which is close to the discharge port of the mechanical oil pump. The connection portion needs to be closer to the mechanical oil pump at least than the junction point at which the oil discharge passage for the mechanical oil pump and the oil discharge passage for the electric oil pump are connected to each other. When the blocking device, for example, the check valve is provided between the mechanical oil pump and the junction point, the connection portion needs to be closer to the mechanical oil pump than the blocking device. The pump-side port may be connected to the case or the cover that forms the mechanical oil pump at a position within the overlap range, in which the pump-side port overlaps the mechanical oil pump, and the communication passage may be directly formed in the case or the cover so that the pump-side port communicates directly with the discharge port of the mechanical oil pump.

In the fourth and fifth embodiments of the invention, the suction device, which sucks the oil from the mechanical oil pump through the communication passage using the oil flow in the lubrication/cooling oil passage, is provided. In this case, the oil needs to flow through the lubrication/cooling oil passage at a predetermined flow-rate. The suction device is formed, for example, as shown in FIG. 6. Alternatively, the oblique oil passage, which obliquely extends from the upstream side toward the downstream side, may be connected to the lubrication/cooling oil passage having a constant cross-section. Because the hydraulic motor is rotated by the flow of the oil flowing through the lubrication/cooling oil passage as described in the tenth embodiment of the invention, various modified examples are implemented. For example, the hydraulic oil pump that rotates the pump provided in the communication passage may be used as a suction device. The suction device may be formed using, for example, an electric oil pump.

The blocking device may be a check valve that restricts the flow of the oil through the communication passage to a one-way flow. Alternatively, the blocking device may be a pilot hydraulic pressure opening/closing valve that mechanically changes the oil flow state between the oil-flow permitted state and the oil-flow blocked state using a predetermined pilot hydraulic pressure, a solenoid opening/closing valve that electrically changes the oil flow state between the oil-flow permitted state and the oil-flow blocked state using a solenoid, etc. As the pilot hydraulic pressure, for example, the hydraulic pressure in the oil discharge passage for the mechanical oil pump is appropriately used.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An oil supply system for a vehicle, comprising:
   a mechanical oil pump that is driven by an engine;
   an electric oil pump that is driven by an electric motor;
   a hydraulic pressure control circuit that is supplied with oil from the mechanical oil pump and the electric oil pump through an oil discharge passage for the mechanical oil pump and an oil discharge passage for the electric oil pump, the oil discharge passage for the mechanical oil pump and the oil discharge passage for the electric oil pump being connected to each other at a junction point upstream of the hydraulic pressure control circuit;
   a lubrication/cooling oil passage that is supplied with the oil from the hydraulic pressure control circuit; and
   a communication passage that branches off from the lubrication/cooling oil passage and that is supplied with the oil from the electric oil pump via the hydraulic pressure control circuit, the communication passage providing communication between the lubrication/cooling oil passage and the mechanical oil pump,
   wherein a pump-side port of the communication passage is connected to an oil intake passage for the mechanical oil pump, at a position close to an inlet port of the mechanical oil pump.

2. The oil supply system according to claim 1, wherein an oil passage-side port of the communication passage is connected to a suction device that sucks oil from a pump-side port through the communication passage using an oil flow through the lubrication/cooling oil passage.

3. The oil supply system according to claim 2, wherein the pump-side port of the communication passage is connected to the mechanical oil pump, at a position above an oil level.

4. The oil supply system according to claim 2,
   wherein:
   the suction device includes a nozzle that reduces a flow passage area of the lubrication/cooling oil passage, a small-flow passage area portion that is formed near an end of the nozzle, a diffuser in which the flow passage area is gradually increased from the small-flow passage area portion, and an intake passage that is formed around an outer periphery of the nozzle and that opens at the small-flow passage area portion; and
   the oil passage-side port of the communication passage is connected to the intake passage.

5. The oil supply system according to claim 2, wherein the suction device is a hydraulic oil pump.

6. An oil supply system for a vehicle, comprising:
   a mechanical oil pump that is driven by an engine;
   an electric oil pump that is driven by an electric motor;
   a hydraulic pressure control circuit that is supplied with oil from the mechanical oil pump and the electric oil pump through an oil discharge passage for the mechanical oil pump and an oil discharge passage for the electric oil pump, the oil discharge passage for the mechanical oil pump and the oil discharge passage for the electric oil pump being connected to each other at a junction point upstream of the hydraulic pressure control circuit;

a lubrication/cooling oil passage that is supplied with the oil from the hydraulic pressure control circuit; and a communication passage that branches off from the lubrication/cooling oil passage and that is supplied with the oil from the electric oil pump via the hydraulic pressure control circuit, the communication passage providing communication between the lubrication/cooling oil passage and the mechanical oil pump, wherein a pump-side port of the communication passage is directly connected to an oil intake hole formed in the mechanical oil pump.

7. The oil supply system according to claim 1, wherein a blocking device that blocks an oil flow is provided in the communication passage.

8. The oil supply system according to claim 7, wherein the blocking device includes a pilot hydraulic pressure opening/closing valve.

9. The oil supply system according to claim 8, wherein the blocking device permits an oil flow through the communication passage when the mechanical oil pump is not driven, and blocks an oil flow through the communication passage when the mechanical oil pump is driven.

10. The oil supply system according to claim 7, wherein the blocking device includes a solenoid opening/closing valve.

11. The oil supply system according to claim 10, wherein the blocking device permits an oil flow through the communication passage when the mechanical oil pump is not driven, and blocks an oil flow through the communication passage when the mechanical oil pump is driven.

12. The oil supply system according to claim 7, wherein the blocking device is a check valve.

* * * * *